(12) United States Patent
Ramsay et al.

(10) Patent No.: US 7,496,218 B2
(45) Date of Patent: **\*Feb. 24, 2009**

(54) SYSTEM AND METHOD FOR IDENTIFYING OBJECTS OF INTEREST IN IMAGE DATA

(76) Inventors: Thomas E. Ramsay, 221 Newhall Pl., SW., Leesburg, VA (US) 20175; Eugene B. Ramsay, 7225 E. 18th St., Tucson, AZ (US) 85710; Gerard Felteau, 12000 Market St., Suite 215, Reston, VA (US) 20190; Victor Hamilton, 20578 Snowshoe Sq. #301, Ashburn, VA (US) 20147; Martin Richard, 22 Francois-Piedmont Street, Boucherville, Quebec (CA) J4B 6X8

( * ) Notice: Subject to any disclaimer, the term of this patent is extended or adjusted under 35 U.S.C. 154(b) by 0 days.

This patent is subject to a terminal disclaimer.

(21) Appl. No.: 11/136,406

(22) Filed: May 25, 2005

(65) Prior Publication Data

US 2006/0013463 A1    Jan. 19, 2006

Related U.S. Application Data

(60) Provisional application No. 60/661,477, filed on Mar. 15, 2005, provisional application No. 60/578,872, filed on Jun. 14, 2004, provisional application No. 60/574,220, filed on May 26, 2004, provisional application No. 60/574,221, filed on May 26, 2004.

(51) Int. Cl.
*G06K 9/00* (2006.01)
*G01N 23/04* (2006.01)

(52) U.S. Cl. .................. 382/128; 382/173; 382/282; 378/57

(58) Field of Classification Search ......... 382/128–134, 382/173, 282; 378/44, 57, 62, 87, 163
See application file for complete search history.

(56) References Cited

U.S. PATENT DOCUMENTS

| | | | | |
|---|---|---|---|---|
| 4,991,092 A | * | 2/1991 | Greensite | 382/131 |
| 5,280,428 A | * | 1/1994 | Wu et al. | 600/407 |
| 5,754,676 A | * | 5/1998 | Komiya et al. | 382/132 |
| 5,854,851 A | * | 12/1998 | Bamberger et al. | 382/132 |
| 5,970,164 A | * | 10/1999 | Bamberger et al. | 382/128 |
| 5,987,345 A | * | 11/1999 | Engelmann et al. | 600/407 |
| 6,088,473 A | * | 7/2000 | Xu et al. | 382/132 |
| 2001/0019623 A1 | * | 9/2001 | Takeo | 382/128 |
| 2002/0094114 A1 | * | 7/2002 | Ogino | 382/128 |
| 2003/0053673 A1 | * | 3/2003 | Dewaele | 382/132 |

* cited by examiner

*Primary Examiner*—Aaron W Carter
(74) *Attorney, Agent, or Firm*—René A. Vazquez

(57) ABSTRACT

A system and method for identifying objects of interest in image data is provided. The present invention utilizes principles of dynamic discontinuity in which objects in images, when subjected to special transformations, will exhibit radically different responses based on the chemical properties of the imaged objects. Using the system and methods of the present invention, certain objects that appear indistinguishable from other objects to the eye or computer recognition systems, or are otherwise statistically identical, generate radically different and statistically significant differences that can be easily measured.

23 Claims, 12 Drawing Sheets
(6 of 12 Drawing Sheet(s) Filed in Color)

Logarithmic

Exponential

Hyperbolic or Parabolic

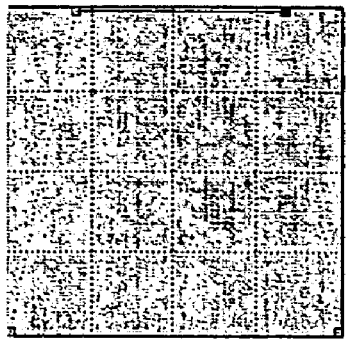
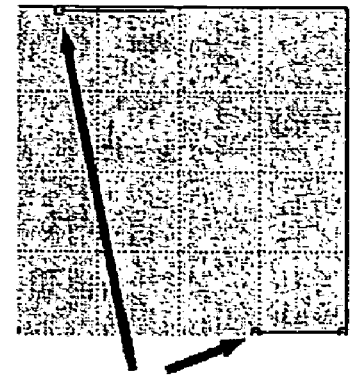
Fig. 5A  Fig. 5B
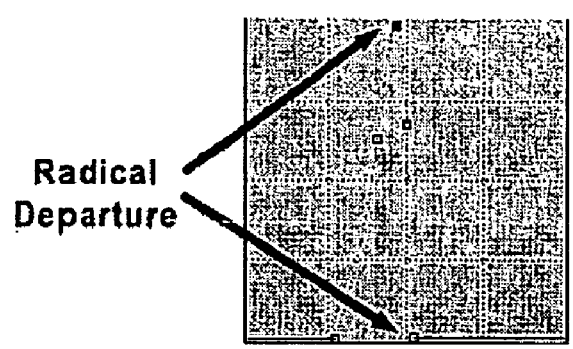
Fig. 5C

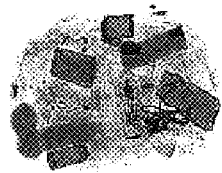
Fig. 8A
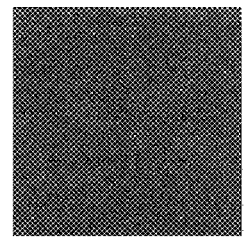
Fig. 8B          Fig. 8C          Fig. 8D
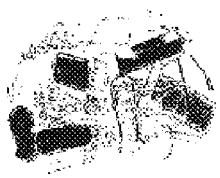
Fig. 8E          Fig. 8F          Fig. 8G

SYSTEM AND METHOD FOR IDENTIFYING OBJECTS OF INTEREST IN IMAGE DATA

REFERENCE TO RELATED APPLICATIONS

This application claims priority to U.S. Provisional Patent Application No. 60/574,220, filed May 26, 2004, U.S. Provisional Patent Application No. 60/574,221, filed May 26, 2004, U.S. Provisional Patent Application No. 60/578,872 filed Jun. 14, 2004 and U.S. Provisional Application No. 60/661,477, filed Mar. 15, 2005, which are incorporated herein by reference in their entirety.

BACKGROUND OF THE INVENTION

1. Field of the Invention

This invention relates to image analysis and, more specifically, to a system and method for identifying objects of interest in image data.

2. Background of the Related Art

Computer-aided image recognition systems rely solely on the pixel content contained in a two-dimensional image. The image analysis relies entirely on pixel luminance or color, and/or spatial relationship of pixels to one another. In addition, image recognition systems utilize statistical analysis methodologies that must assume that the forms of the underlying density (distribution) functions distinguishing the image objects are known (i.e., parametric densities). Classical parametric densities are usually unimodal with a single local maximum distribution of optic characteristics, such as density or color.

However, most real-world image analysis problems involve multi-modal densities, often with distributed low-dimensional densities making identification with existing pattern recognition approaches difficult, if not impossible. The following are some of the specific issues limiting existing image analysis methodologies:

(1) input data (image objects) need to be parametric;

(2) did not adjust for scale, rotation, perspective, size, etc.;

(3) classes of objects need to be statistically distinct in the image;

(4) black and white and grayscale processing is insufficient to identify complex images; and (5) color processing can be very computationally intensive.

SUMMARY OF THE INVENTION

An object of the invention is to solve at least the above problems and/or disadvantages and to provide at least the advantages described hereinafter.

Therefore, an object of the present invention is to provide an expert system capable of detecting objects of interest in image data with a high degree of statistical confidence and accuracy.

Another object of the present invention is to provide a system and method that does not rely on a prior knowledge of an objects shape, volume, texture or density to be able to locate and identify a specific object or object type in an image.

Another object of the present invention is to provide a system and method of identifying objects of interest in image data that is effective at analyzing images in both two- and three-dimensional representational space using either pixels or voxels.

Another object of the present invention is to provide a system and method of distinguishing a class of known objects from objects of similar color and texture in image data, whether or not they have been previously observed by the system.

Another object of the present invention is to provide a system and method of identifying objects of interest in image data that works with very difficult to distinguish/classify image object types, such as: (i) random data; (ii) non-parametric data; and (iii) different object types in original images.

Another object of the present invention is to provide a system and method of identifying objects of interest in image data that can cause either convergence or divergence of image object characteristics.

Another object of the present invention is to provide a system and method of identifying objects of interest in image data that can preserve object self-similarity during transformations.

Another object of the present invention is to provide a system and method of identifying objects of interest in image data that is deterministic and stable in its behavior.

To achieve the at least above objects, in whole or in part, there is provided a method of identifying a threat object of interest in X-ray image data, comprising receiving the X-ray image data, and applying at least one bifurcation transform to the X-ray image data to effect divergence of the threat object of interest from other objects.

To achieve the at least above objects, in whole or in part, there is also provided an apparatus configured to identify a threat object of interest in X-ray image data, comprising an input device configured to receive the X-ray image data, and an image transformation recognition system configured to apply at least one bifurcation transform to the X-ray image data to effect divergence of the threat object of interest from other objects.

To achieve the at least above objects, in whole or in part, there is also provided a method of creating a bifurcation transform for a class of threat objects, comprising selecting a point operation, performing said point operation on a subset of images, wherein said subset of images includes at least one image containing an object in said class of threat objects, and repeating said selecting and said performing steps until said point operation bifurcates said object.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The patent or application file contains at least one drawing executed in color. Copies of this patent or patent application publication with color drawing(s) will be provided by the Patent Office upon request and payment of the necessary fee.

The invention will be described in detail with reference to the following drawings, in which like reference numerals refer to like elements, wherein:

FIGS. 5A-5C are histograms of nonlinear point operations, in accordance with the present invention;

FIGS. 8A-8M are x-ray images of a suitcase at different stages in the image transformation recognition process of the present invention;

DETAILED DESCRIPTION OF PREFERRED EMBODIMENTS

Definition of Terms

Figure 1:
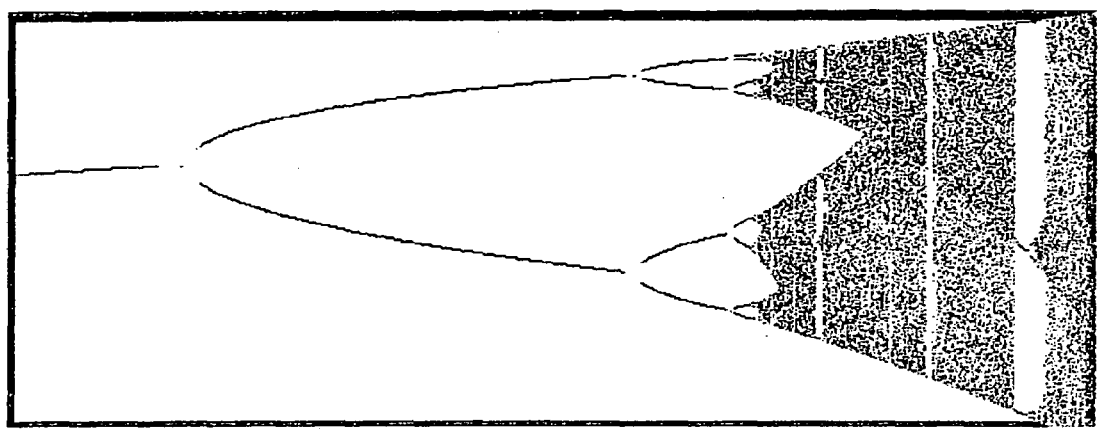
FIG. 1 is a bifurcation diagram.

The following definitions hold throughout the contents of this application. If additional or alternative definitions of the same or similar words are provided herein, those definitions should be included herein as well.

Statistically identical: Two sets of data are referred to as "statistically identical" if under one or more types of statistics or observation there is essentially no discernable difference between them.

Point operation: Point operation is a mapping of a plurality of data from one space to another space which, for example, can be a point-to-point mapping from one coordinate system to a different coordinate system. Such data can be represented, for example, by coordinates such as (x, y) and mapped to different coordinates ($\alpha,\beta$) values of pixels in an image.

Z effective ($Z_{eff}$): Is the effective atomic number for a mixture/compound of elements. It is an atomic number of a hypothetical uniform material of a single element with an attenuation coefficient equal to the coefficient of the mixture/compound. Z effective can be a fractional number and depends not only on the content of the mixture/compound, but also on the energy spectrum of the x-rays.

Transform: A transform is an operation that changes or transforms a first set of data points into a second set of data points.

Bifurcate: To bifurcate is to cause a data set to change in a manner such that information that was otherwise not readily or easily obtainable becomes available or accessible.

Bifurcation transform: A bifurcation transform is a transform which when operating on data such as a segment or subset of an image, causes information relating to the content of the data that otherwise would not have been readily or easily apparent to become available or more easily apparent or accessible.

For example, when applying a bifurcation transform to an image or a segment of the image, information regarding the contents of the image which would not have been easily recognized prior to application of the bifurcation transform becomes more apparent or known. For example, two objects in the same image that are statistically indistinguishable become statistically distinguishable after the bifurcation transform is applied.

Hyperspectral data: Hyperspectral data is data that is obtained from a plurality of sensors at a plurality of wavelengths or energies. A single pixel or hyperspectral datum can have hundreds or more values, one for each energy or wavelength. Hyperspectral data can include one pixel, a plurality of pixels, or a segment of an image of pixels, etc., with said content. As contained herein, it should be noted that hyperspectral data can be treated in a manner analogous to the manner in which data resulting from a bifurcation transform is treated throughout this application for systems and methods for threat or object recognition, identification, image normalization and all other processes and systems discussed herein.

For example, a bifurcation transform can be applied to hyperspectral data in order to extract information from the hyperspectral data that would not otherwise have been apparent. Bifurcation transforms can be applied to a plurality of pixels at a single wavelength of hyperspectral data or multiple wavelengths of one or more pixels of hyperspectral data in order to observe information that would otherwise not have been apparent.

Nodal point: A nodal point is a point on a transform at which pixels close to the nodal point can observe a significantly distinguishable change in value upon application of the transform.

Object: An object can be a person, place or thing.

Object of interest: An object of interest is a class or type of object such as explosives, guns, tumors, metals, knives, etc. An object of interest can also be a region with a particular type of rocks, vegetation, etc.

Threat: A threat is a type of object of interest which typically but not necessarily could be dangerous.

Image receiver: An image receiver can include a process, a processor, software, firmware and/or hardware that receives image data.

Image mapping unit: An image mapping unit can be a processor, a process, software, firmware and/or hardware that maps image data to predetermined coordinate systems or spaces.

Comparing unit: A comparing unit can be hardware, firmware, software, a process and/or processor that can compare data to determine whether there is a difference in the data.

Color space: A color space is a space in which data can be arranged or mapped. One example is a space associated with red, green, blue (RGB). However, it can be associated with any number and types of colors or color representations in any number of dimensions.

Predetermined color space: A predetermined color space is a space that is designed to represent data in a manner that is useful and that could, for example, causes information that may not have otherwise been apparent to present itself or become obtainable or more apparent.

RGB DNA: RGB DNA refers to a representation in a predetermined color space of most or all possible values of colors which can be produced from a given image source. Here, the values of colors again are not limited to visual colors but are representations of values, energies, etc., that can be produced by the image system.

Signature: A signature can be a representation of an object of interest or a feature of interest in a predetermined space and a predetermined color space. This applies to both hyperspectral data and/or image data.

Template: A template is part or all of an RGB DNA and corresponds to an image source or that corresponds to a feature or object of interest for part or all of a mapping to a predetermined color space.

Algorithms: From time to time, transforms and/or bifurcation transforms are referred to herein as algorithms.

Algorithms and systems discussed throughout this application can be implemented using software, hardware, and firmware.

The analysis capabilities of the present invention can apply to a multiplicity of input devices created from different electromagnetic and sound emanating sources such as ultraviolet, visual light, infra-red, gamma particles, alpha particles, etc.

Image Transformation Recognition System and Method

General Overview

The present invention identifies objects of interest in image data utilizing a process herein termed "Image Transformation Recognition" (ITR). The ITR process can cause different yet statistically identical objects in a single image to diverge in their measurable properties. This phenomenon can be compared to the dynamic discontinuities observed in other fields of science, such as fluid mechanics. An aspect of the present invention is the discovery that objects in images, when subjected to special transformations, will exhibit radically different responses based on the physical properties of the imaged objects. Using the system and methods of the present invention, certain objects that appear indistinguishable from other objects to the eye or computer recognition systems, or are otherwise statistically identical, generate radically different and statistically significant differences that can be measured.

An aspect of the present invention is the discovery that objects in images can be driven to a point of non-linearity by certain transform parameters. As these transform parameters are increased, the behavior of the system progresses from one of simple stability, through a series of structural changes, to a state of a unique and radical change based on the interaction of the real object to the imaging modality characteristics. This point of rapid departure from stability is called the "point of bifurcation." Bifurcation theory, simply stated, means "applying a little bit to achieve a big difference."

FIG. 1 is an example of a bifurcation diagram. A single object type in an image is represented as a simple point on the left of the diagram. There are several branches in the diagram as the line progresses from the original image representation on the left, indicating node points where bifurcation occurs. Finally, on the far right, the image moves into what Catastrophe theory describes as chaos. Between the original image and chaos lies the basis for discrimination in the system and methods of the present invention.

Catastrophe theory, of which bifurcation theory is a subset, indicates that a dynamical system is or can become chaotic if it: (1) has a dense collection of points; (2) is sensitive to the initial condition of the system (so that initially nearby points can evolve quickly into very different states); and (3) is topologically transitive (neighborhoods of points eventually get flung out to "big" sets).

Images meet all three of the above criteria. An aspect of the present invention is that one can apply this "principle of bifurcation" to the apparent (non-dynamic) stability of fixed points or pixels in an image and, by altering one or more parameter values, give rise to a set of new, distinct and clearly divergent image objects. Because each original object captured in an image responds uniquely at its point of bifurcation, the methods of the present invention can be used in an image recognition system to distinguish and measure objects. It is particularly useful in separating and identifying objects that have almost identical color, density and volume.

The ITR system and method provides at least the following advantages over prior image extraction methodologies:

(1) It is an expert system capable of detecting objects with a high degree of statistical confidence and accuracy/precision;

(2) It does not rely on a prior knowledge of an objects shape, volume, texture or density to be able to locate and identify a specific object or object type in the image;

(3) It is effective at analyzing images in multi-dimensional representational space using either pixels or voxels;

(4) It is most powerful where a class of known objects is to be distinguished from objects of similar color and texture, whether or not they have not been previously observed or trained by the ITR system;

(5) It works with very difficult to distinguish/classify image object types, such as: (i) random data; (ii) non-parametric data; and (iii) different object types in original images (threats and non-threats for example or different types of threats) have indistinguishable differences between their features when analyzed statistically (they continually are determined to be in the same class when applying pattern recognition/statistical analytic methods);

(6) It performs equally well with both parametric and non-parametric statistical data sampling techniques;

(7) It can more effectively apply statistical analysis tools to distinguish data;

(8) It can cause either convergence or divergence of image object features;

(9) It can preserve object geometrical integrity during transformations; and

(10) It is deterministic and stable in its behavior.

In one exemplary embodiment of the present invention, special transformations are applied to images in an iterative "filter chain" sequence. This process is herein referred to as a Simple Signature Iterative Clustering (SSIC) process.

The nature of the sequence of transforms causes objects in the image to exhibit radically different responses based on the physical properties inherent in the original objects. Using the SSIC process, certain objects that appear indistinguishable to the eye or computer recognition systems from other objects, generate radically different and statistically significant differences that can be easily measured.

As transform parameters are increased, the behavior of the objects progresses from one of simple stability, through a sequence of structural changes, to a state of a unique and radical change (point of non-linearity) based on the interaction of the real object to the imaging modality characteristics.

The ITR process works with an apparently stable set of fixed points or pixels in an image and, by altering one or more parameter values, giving rise to a set of new, distinct, and clearly divergent image objects. The ITR process is most effective when applied to images that exhibit the following three characteristics:

(1) The image has a dense collection of points;
(2) The image is sensitive to the initial condition of the system (so that initially nearby points can evolve quickly into very different states); and
(3) The image is topologically transitive (neighborhoods of points eventually get flung out to "big" sets in color space).

Because of the nature of the transformations known and utilized in the science of digital image processing to date, the ITR system and method of the present invention has neither been known nor utilized. Commonly used and understood transforms work within the domain where images maintain equilibrium. These transforms do not work where image/object discontinuities occur.

As will be discussed in more detail below, the ITR method starts by first segmenting the image into objects of interest, then applying different filter sequences to the same original pixels in the identified objects of interest using the process. In this way, the process is not limited to a linear sequence of filter processing.

Because of the unique nature of the segmentation process using this iterative approach, objects within objects can be examined. As an example, an explosive inside of a metal container can be located by first locating all containers, remapping the original pixel data with known coordinates in the image and then examining the remapped original pixels in the identified object(s) in the image for threats with additional filter sequences.

With the ITR process, transforms can be tuned to optimize clustering of images. In addition, the process works for both image segmentation and feature generation through an iterative process of applying image transforms. It is defined mathematically as a reaching a "Point of Attraction".

Exemplary Embodiments

Figure 2:
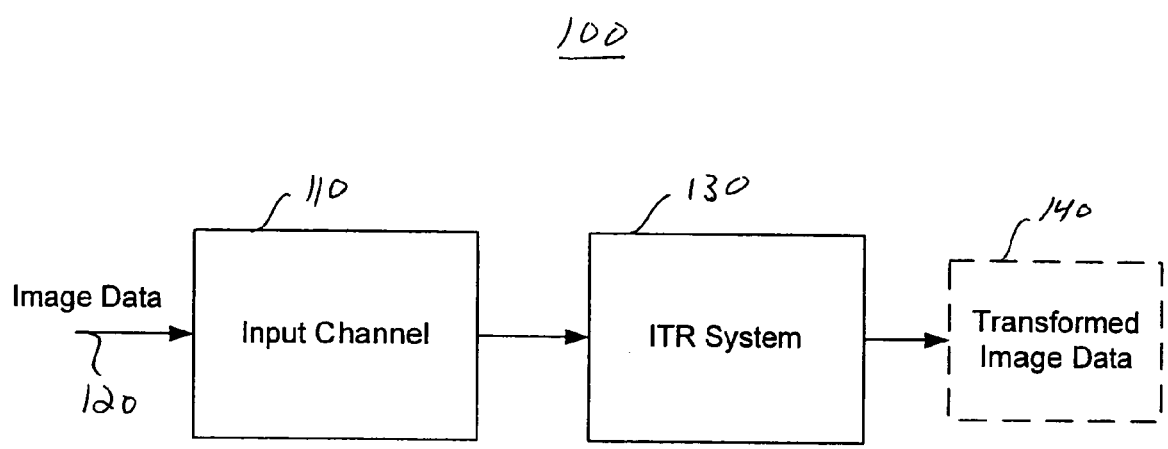
FIG. 2 is a block diagram of a system for identifying an object of interest in image data, in accordance with one embodiment of the present invention.

FIG. 2 is a block diagram of a system 100 for identifying an object of interest in image data, in accordance with one embodiment of the present invention. The system 100 comprises an input channel 110 for inputting image data 120 from an image source (not shown) and an ITR system 130. The ITR system generates transformed image data, in which the object of interest is distinguishable from other objects in the image data.

Figure 3:
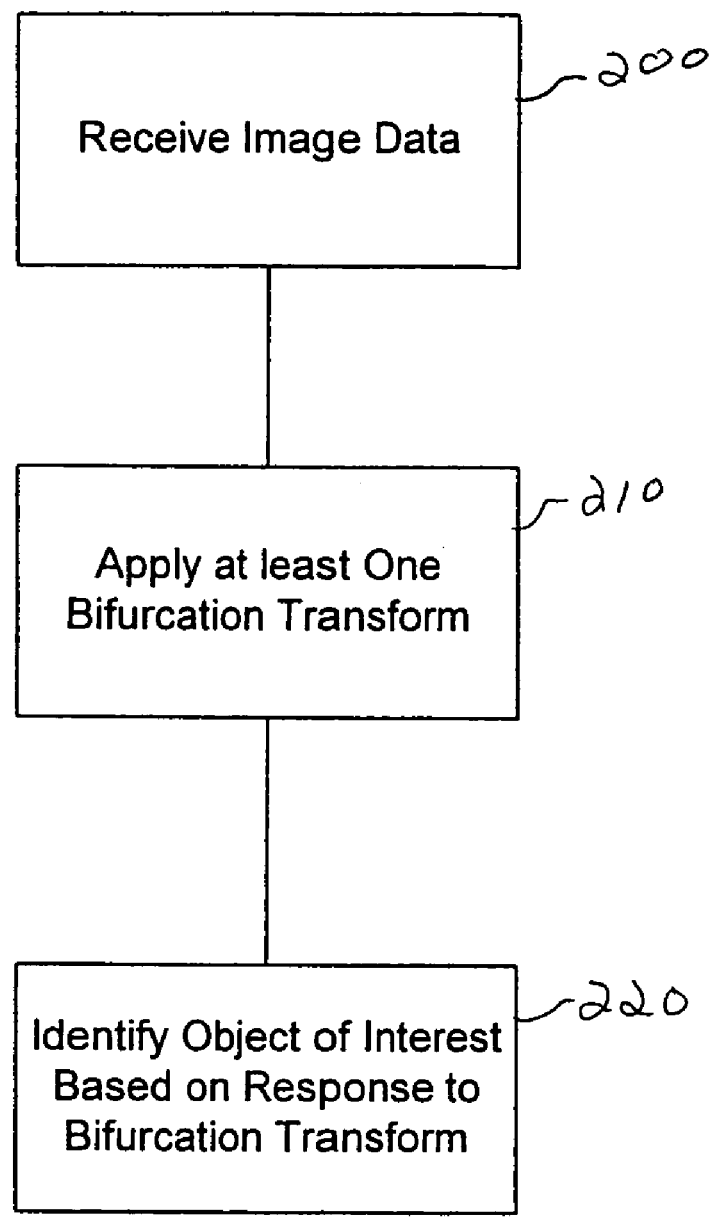
FIG. 3 is a flowchart of a method for identifying an object of interest in image data, in accordance with one embodiment of the present invention.

The operation of the ITR system 130 of FIG. 2 will now be explained in connection with FIG. 3, which is a flowchart of a method for identifying an object of interest in image data, in accordance with one embodiment of the present invention. The method starts at step 100, where image data 120 is received via the input channel 110. The object of interest can be any type of object. For example, the object of interest can be a medical object of interest, in which case the image data can be computer tomography (CT) image data, x-ray image data, or any other type of medical image data. As another example, the object of interest can be a threat object, such as weapons, explosives, biological agents, etc., that may be hidden in luggage. In the case, the image data is typically x-ray image data from luggage screening machines.

At step 210, at least one bifurcation transform is applied to the image data 120 by the ITR system 130, and transformed image data 140 is generated. The at least one bifurcation transform is adapted to cause the object of interest to diverge from other objects in the image. The at least one bifurcation transform will be discussed in more detail below.

Next, at step 220, the object of interest is identified in the transformed image data 140 based on the object's response to the at least one bifurcation transform.

The at least one bifurcation transform is preferably a point operation. A point operation converts a single input image into a single output image. Each output pixel's value depends only on the gray level of its corresponding pixel in the input image. Input pixel coordinates correlate to output pixel coordinates such that $X_i, Y_i \rightarrow X_o, Y_o$. A point operation does not change the spatial relationships within an image. This is quite different from local operations where the value of neighboring pixels determines the value of the output pixel.

Figure 4A:
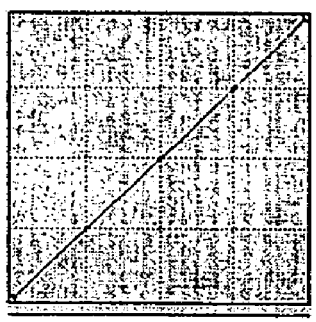
FIGS. 4A-4E are histograms of various point operations, in accordance with the present invention.

Point operations can correlate both gray levels and individual color channels in images. One example of a point operation is shown in the histogram of FIG. 4A. In FIG. 4, 8 bit (256 shades of gray) input levels are shown on the horizontal axis and output levels are shown on the vertical axis. If one were to apply the point operation of FIG. 4 to an input image, there would be a 1 to 1 correlation between the input and the output (transformed) image. Thus, input and output images would be the same.

Point operations are predictable in how they modify the gray-level histograms of an image. Point operations are typically used to optimize images by adjusting the contrast or brightness of an image. This process is known as contrast enhancing or gray-scale transformations. They are typically used as a copying technique, except that the gray levels are modified according to the specified gray-scale transformation function. Point operations are also typically used for photometric calibration, contrast enhancement, monitor display calibration, thresholding and clipping to limit the number of levels of gray in an image. The point operation is specified by the transformation function and can be defined as:

$$B(x,y)=f[A(x,y)],$$

where A is an input image and B is an output image.

The at least one bifurcation transform used in the ITR system 130 can be either linear or non-linear point operations, or both. Linear point operations contain straight lines in their histogram representation, while non-linear (logarithmic, exponential, and hyperbolic/parabolic) point operations have curved lines. Non-linear point operations are used for changing the brightness/contrast of a particular part of an image relative to the rest of the image. This can allow the midpoints of an image to be brightened or darkened while maintaining blacks and white in the picture.

Figure 4B:
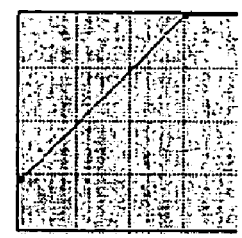
Figure 4C:
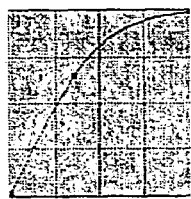
Figure 4D:
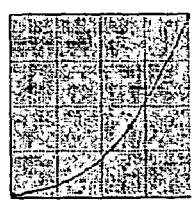
Figure 4E:
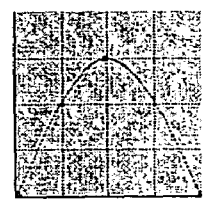

FIG. 4B is a histogram a linear point operation, and FIGS. 4C-4E are histograms of some non-linear point operations. An aspect of the present invention is the discovery that point operations can be used as bifurcation transforms for bringing images to a point of non-linearity. This typically requires a radical change in the output slope of the resultant histogram, such as that provided in the point operation illustrated by the histogram of FIG. 5A.

The present invention utilizes radical grayscale, color channel or a combination of luminance and color channel bifurcation transforms (point operations) to achieve image object bifurcation for purposes of image analysis and pattern recognition of objects. The placement of the nodal points in the bifurcation transform is one key parameter. An example of nodal point placements are shown in the bifurcation transform example illustrated by the histogram of FIG. 5B.

The nodal points in the bifurcation transforms (point operations) used in the present invention are placed so as to frequently create radical differences in color or luminance between image objects that otherwise statistically identical.

Figure 6A:
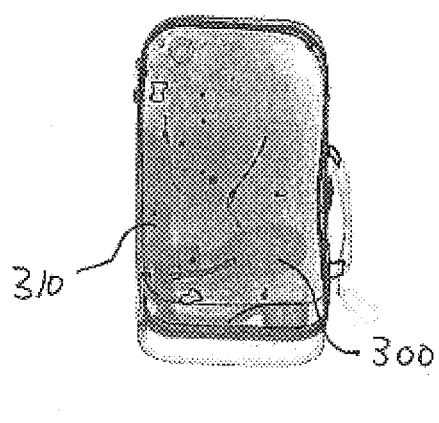
FIG. 6A is an input x-ray image of a suitcase, in accordance with the present invention.
Figure 6B:
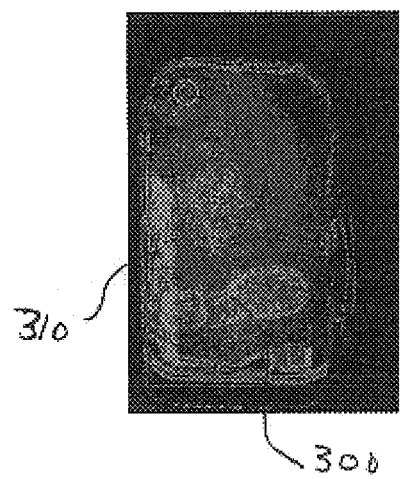
FIG. 6B is the x-ray image of FIG. 6a after application of the image transformation recognition process of the present invention.

This is illustrated in the sample bifurcation transform of FIG. 5C. Using this bifurcation transform, two objects that are very close in color/luminance in an original image would be on opposite sides of a grayscale representation in the output (transformed) image. FIG. 6A shows an input image, and FIG. 6B shows the changes made to the input image (the transformed image obtained) as a result of applying the bifurcation transform of FIG. 5C. The input image is an x-ray image of a suitcase taken by a luggage scanner. In this example, the objects of interest are shoes 300 and a bar 310 on the left side of the suitcase.

Note that the orange background has gone a very different color from the shoes 300 and the bar 310 on the left side of the suitcase. The bifurcation transform of FIG. 5C uniquely delineates the objects of interest, while eliminating the background clutter in the image.

As can be seen by the input and transformed images shown in FIGS. 6A and 6B, respectively, the orange background in the image makes a radical departure from the orange objects of interest (300 and 310) and other objects that are almost identical to the objects of interest. The use of different nodal points in the bifurcation transform will cause the objects of interest to exhibit a different color from other objects.

Data points connecting the nodes can be calculated using several established methods. A common method of mathematically calculating the data points between nodes is through the use of cubic splines.

Additional imaging processes are preferably applied in the process of object recognition to accomplish specific tasks. Median and dilate algorithms cause neighboring pixels to behave in similar ways during the bifurcation transformation, and may be applied to assure the objects' integrity during the transformation process.

Figure 7:
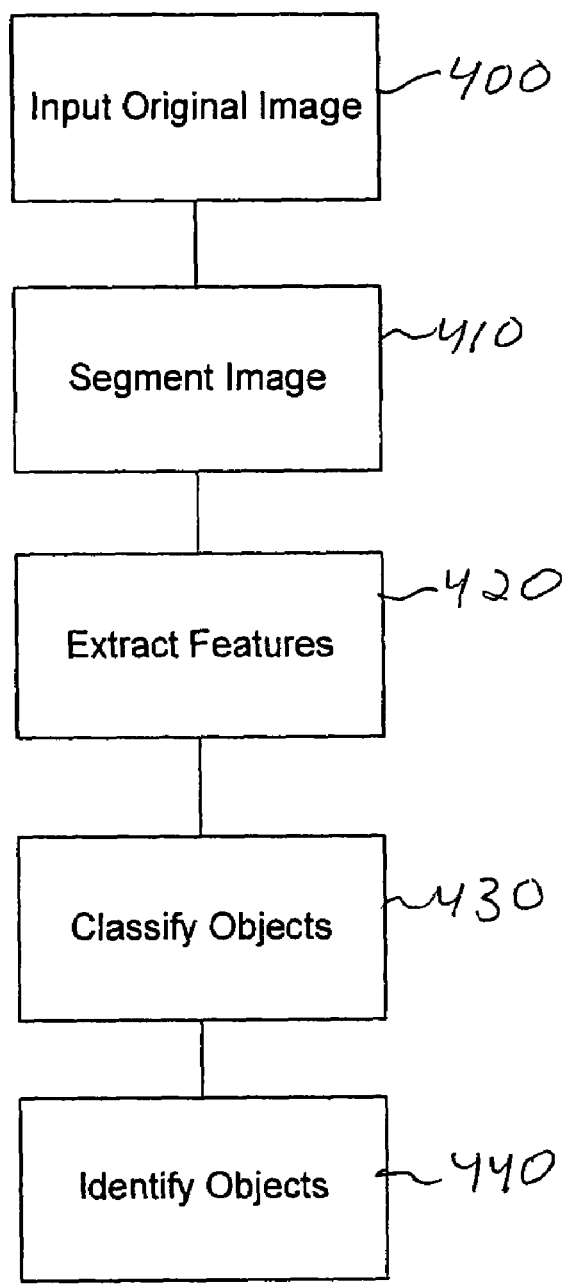
FIG. 7 is a flowchart of a method for identifying an object of interest in image data, in accordance with another embodiment of the present invention.

FIG. 7 is a flowchart of a method for identifying an object of interest in image data, in accordance with another embodiment of the present invention. The method steps in the flowchart of FIG. 7 will be explained with reference to the images shown in FIGS. 8A-8M, which are x-ray images of a suitcase at different stages in the ITR process. These images are just one example of the types of images that can be analyzed with the present invention. Other types of images, e.g., medical images from X-ray machines or CT scanners, or quantized photographic images can also be analyzed with the system and methods of the present invention.

The method starts at step 400, where the original image, such as the suitcase image shown in FIG. 8A, is received. The sample image shown in FIG. 8A contains clothing, shoes, cans of spray, a hair dryer, a jar of peanuts, peanut butter, a bottle of water, fruit and the object of interest.

Figure 8H:
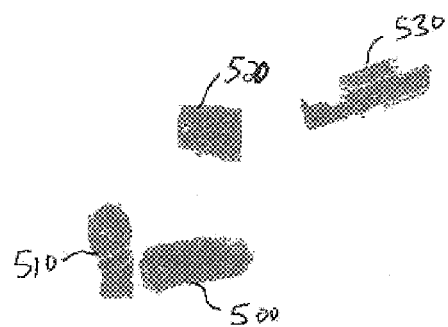

At step 410, the image is segmented by applying a color determining transform that affect specifically those objects that match a certain color/density/effective atomic number characteristics. Objects of interest are isolated and identified by their responses to the sequence of filters. The image segmentation step is preferably a series of sub-steps. FIGS. 8B-8H show the image after each segmentation sub-step. The resulting areas of green in FIG. 8G are analyzed to see if they meet a minimum size requirement. This removes the small green pixels. The remaining objects of interest are then re-mapped to a new white background, resulting in the image of FIG. 8H. Most of the background, organic substances, and metal objects are eliminated in this step, leaving the water bottle 500, fruit 510, peanut butter 520 and object of interest 530.

At step 420, features are extracted by subjecting the original pixels of the areas of interest identified in step 410 to at least one feature extraction process. It is at this step that at least one bifurcation transform is applied to the original pixels of the areas of interest identified in step 410.

In the image examples shown in FIGS. 8I-8M, two feature extraction processes are applied. The first process in this example uses the following formulation (in the order listed):
 (1) Replace colors
 (2) Maximum filter 3×3
 (3) Median filter 3×3
 (4) Levels and Gamma Luminance=66 black level and 255 white level and Green levels=189 black, 255 white and gamma=9.9
 (5) Apply bifurcation transform
 (6) Maximum filter 3×3
 (7) Replace black with white
 (8) Median filter 3×3

Figure 8I:
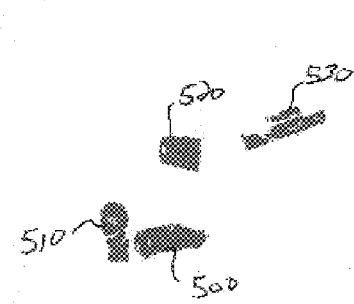
Figure 8J:
Figure 8K:

The image shown in FIG. 8I results after process step (4) above, the image shown in FIG. 8J results after process step (5) above, and the image shown in FIG. 8K results after process step (7) above. Note that most of the fruit 510 and the water bottle 500 pixels on the lower left-hand side of the image in FIG. 8K have either disappeared or gone to a white color. This is in contrast to the preservation of large portions of the peanut butter jar 520 pixels and object of interest 530 pixels, which are now remapped to a new image in preparation for the second feature extraction process.

Figure 8L:
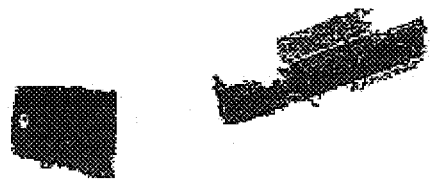
Figure 8M:
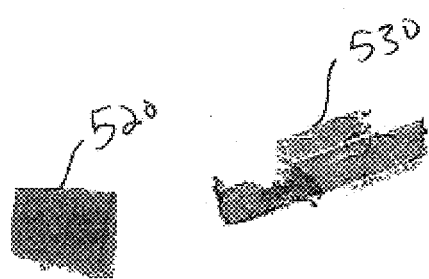
Figure 8N:
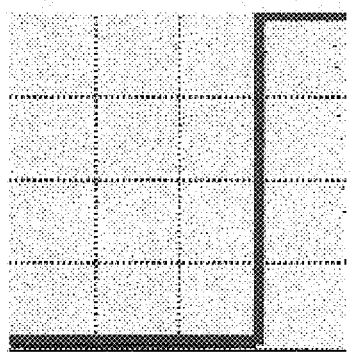
FIG. 8N is an example of a bifurcation transform applied to an x-ray image during the image transformation recognition process of the present invention.

The second feature extraction process applied as part of step 420 distinguishes the two remaining objects 520 and 530. Replace color algorithms (same as process step (2) above) are applied, then two levels (two of process step (4) above) and then the bifurcation transform shown in FIG. 8N is applied. FIG. 8L shows the image after replace color algorithms and two levels are applied. FIG. 8M shows the image after the bifurcation transform of FIG. 8N is applied.

At step 430, the objects are classified based on their response at the feature extraction step (step 420). The object of interest 530 is measured in this process for its orange content. The peanut butter jar 520 shows green as its primary vector, and is therefore rejected. At step 440, the remaining object 530 is identified as an object of interest.

Determination of distinguishing vectors generated at step 420 is determined by statistical analysis of both objects of interest and other possible objects. This can be accomplished by applying existing statistical analysis. One example of a decision tree based on one process, along with a sample logic rule set for the decision tree (which is integrated into software) is shown below in Appendix A. In one approach, only leafs that show 100%/0% differences between objects with no overlap are used.

This is then entered into code and accessed from an object oriented scripting language called TAL. TAL (Threat Access Language) is linked to functions and logic in the PinPoint software code. Its design allows for rapid extension of the principals to new objects of interest. A sample of TAL is shown below.

```
call show_msg("C4 Process 3a")
endif
call set_gray_threshold(255)
call set_area_threshold(400)
call color_replace_and(image_wrk,dont_care,dont_care,greater_than,0,0,45,255,255,255)
call color_replace_and(image_wrk,less_than,dont_care,less_than,128,0,15,255,255,255)
call apply_curve(image_wrk,purple_path)
call color_replace_and(image_wrk,equals,equals,equals,65,65,65,255,255,255)
call color_replace_and(image_wrk,equals,equals,equals,0,255,0,255,255,255)
```

```
-continued call color_replace_and(image_wrk,greater_than,equals,equals,150,0,255,0,255,0)
call color_replace_and(image_wrk,equals,equals,equals,0,0,255,255,255,255)
call color_replace_and(image_wrk,dont_care,less_than,less_than,0,255,255,255,255,255)
call color_replace_and(image_wrk,dont_care,equals,dont_care,0,0,0,255,255,255)
#if (show_EOP = 1)
# call display_and_wait(image_wrk)
#endif
call pix_map = get_first_aoi(image_wrk,ALLCHAN,1,0)
if (pix_map = 0)
    jump @done_with_file
endif
call destroy_pixmap(AOI_wrk)
call AOI_wrk = copy_pixmap
call color_replace (image_tmp,greater_than,greater_than,greater_than,-1,-1,-1,255,255,255)
aoinum = 1
@C4loop3
    call show_AOI_bounding_box( )
# if(show_AOI = 1)
#   call display_and_wait(AOI_wrk)
# endif
    call AOI_masked = get_pixmap_from_bbox(scan_org,0)
    call image_tmp2 = composite_aoi(image_tmp,AOI_masked,255,255,255)
    call destroy_pixmap(image_tmp)
    call image_tmp = copy_pixmap(image_tmp2)
    call destroy_pixmap(image_tmp2)
    call destroy_pixmap(AOI_masked)
    call pix_map = get_next_aoi( )
    if (pix_map = 0)
        call destroy_aoi_list( )
        jump @C4Process3b
    endif
    call destroy_pixmap(AOI_wrk)
    call AOI_wrk = copy_pixmap
    aoinum = aoinum + 1
jump @C4loop3
```

A second pass is now made with all images. The rules defined above can now eliminate objects identified in process 1. A second process that follows the logic rules will now create objects of new colors for the remaining objects of interest. The vectors (metrics) of the transformed objects of interest are examined. Multiple qualitative approaches may be used in the evaluation of the objects, such as prototype performance and figure of merit. Metrics in the spatial domain, such as image amplitude (luminance, tristimulus value, spectral value) utilizing different degrees of freedom, the quantitative shape descriptions of a first-order histogram, such as Standard Deviation, Mean, Median, Skewness, Kurtosis, Energy and Entropy, % Color for red, green, and blue ratios between colors (total number of yellow pixels in the object/the total number of red pixels in the object), object symmetry, are some, but not all, of the possible measurements that can be used. Additional metrics can be created by applying spectrally-based processes such as Fourier and Wavelet transforms to the previously modified objects of interest or by analyzing eigenvalue plots produced from a Principal Components Analysis.

A color replacement technique is used to further emphasize tendencies of color changes. For example, objects that contain a value on the red channel>100, can be remapped to a level of 255 red so all bright red colors are made pure red. This is used to help identify metal objects that have varying densities. The ratio of these two colors is now a fixed ratio between the two. Color 1/Color 2=Invariant Ratio (IR).

This IR can now help indicate the presence of a certain metal objects regardless of its orientation in the image. It can also be correlated to geometric measurements using tools that determine boundaries and shapes. An example would be the correlation of IR with boundaries and centroid location. Other process may additionally be used as well.

The system and methods of the present invention are based on a methodology that is not restricted to a specific image type or imaging modality. It is capable of identifying and distinguishing a broad range of object types across a broad range of imaging applications. It works equally as well in applications such as CT scans, MRI, PET scans, mammography, cancer cell detection, geographic information systems, and remote sensing. It can identify and distinguish metal objects as well.

Figure 9A:
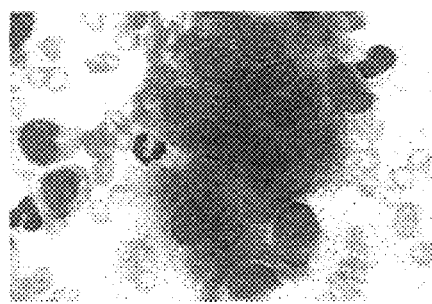
FIG. 9A is an original input medical image of normal and cancerous cells.
Figure 9B:
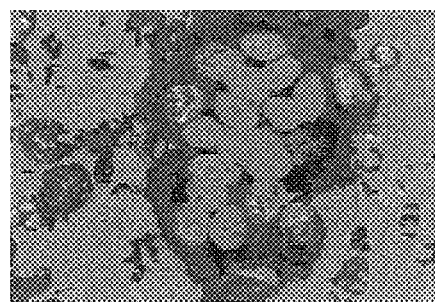
FIG. 9B is the image of FIG. 9A after application of the image transformation recognition process of the present invention.

In medicine, the present invention is capable of, for example, distinguishing cancer cell growth in blood samples and is being tested with both mammograms and x-rays of lungs. For example, FIG. 9A shows an original input image with normal and cancerous cells. FIG. 9B shows the image after the ITR process of the present invention has been applied, with only cancer cells showing up in green.

The statistical processing provided by the present invention can be extended to integrate data from a patient's familial history, blood tests, x-rays, CT, PET (Positron Emission Tomography), and MRI scans into a single integrated analysis for radiologists, oncologists and the patient's personal physician. It can also assist drug companies in reducing costs by minimizing testing time for new drug certification.

The ITR system 130 can be implemented with a general purpose computer. However, it can also be implemented with a special purpose computer, programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of executing code for implementing the process steps of FIGS. 3 and 7 can be used to implement the ITR system 130.

Input channel 110 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, and ATM (Asynchronous Transfer Mode) connection, or an FDDI (Fiber Distributed Data Interface) or CDDI (Copper Distributed Data Interface) connection. Input channel 110 may furthermore be, include or interface to any one or more of a WAP (Wireless Application Protocol) link, a GPRS (General Packet Radio Service) link, a GSM (Global System for Mobile Communication) link, CDMA (Code Division Multiple Access) or TDMA (Time Division Multiple Access) link such as a cellular phone channel, a GPS (Global Positioning System) link, CDPD (Cellular Digital Packet Data), a RIM (Research in Motion, Limited) duplex paging type device, a Bluetooth radio link, or an IEEE 802.11-based radio frequency link. Input channel 110 may yet further be, include or interface to any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the present invention, as defined in the following claims.

APPENDIX A

| Columns: | Role: | Type: | Levels: |
| --- | --- | --- | --- |
| THREAT | dependent | categorical | NOT C4 |
|  |  |  | C4 |
| Red % | independent | continuous |  |
| Green % | independent | continuous |  |
| Blue % | independent | continuous |  |
| Black % | independent | continuous |  |
| Yellow % | independent | continuous |  |
| Magenta % | independent | continuous |  |
| Cyan % | independent | continuous |  |
| RedMean | independent | continuous |  |
| RedMed | independent | continuous |  |
| RedStd | independent | continuous |  |
| GreenMean | independent | continuous |  |
| GreenMed | independent | continuous |  |
| GreenStd | independent | continuous |  |
| BlueMean | independent | continuous |  |
| BlueMed | independent | continuous |  |
| BlueStd | independent | continuous |  |
| RGBMean | independent | continuous |  |
| RGBMed | independent | continuous |  |
| RGBStd | independent | continuous |  |

Predicting THREAT: (1 Trees)

Tree #1
Tree Structure:
[1]
[2] - ( Red % < 45.59520750 ) --> NOT C4 (3480)
[4] - ( GreenStd < 51.03263250 ) --> NOT C4 (3289)
[8] - ( RedMean >= 48.48295400 ) --> NOT C4 (1933)
[16] - ( RGBStd < 52.36232400 ) --> NOT C4 (1931)
[32] - ( RGBMean < 81.01520150 ) --> NOT C4 (1633)
[64] - ( Black % < 15.09932550 ) --> NOT C4 (540)
[65] - ( Black % >= 15.09932550 ) --> NOT C4 (1093)
[130] - ( Black % >= 15.12923250 ) --> NOT C4 (1091)
[260] - ( GreenMean < 75.62565250 ) --> NOT C4 (1086)
[520] - ( Red % >= 31.87044900 ) --> NOT C4 (126)
[521] - ( Red % < 31.87044900 ) --> NOT C4 (960)
[1042] - ( RedStd < 50.30793950 ) --> NOT C4 (926)
[2084] - ( RedStd >= 49.63398000 ) --> NOT C4 (83)
[2085] - ( RedStd < 49.63398000 ) --> NOT C4 (843)
[4170] - ( RedStd < 43.81623850 ) --> NOT C4 (66)
[4171] - ( RedStd >= 43.81623850 ) --> NOT C4 (777)
[8342] - ( Black % < 15.87751300 ) --> NOT C4 (59)
[8343] - ( Black % >= 15.87751300 ) --> NOT C4 (718)
[16686] - ( Yellow % < 0.03592250 ) --> NOT C4 (628)
[33372] - ( RedMean >= 51.05065700 ) --> NOT C4 (511)
[66744] - ( GreenMean < 70.19668950 ) --> NOT C4 (498)
[133488] - ( Red % < 20.61720300 ) --> NOT C4 (92)
[133489] - ( Red % >= 20.61720300 ) --> NOT C4 (406)
[266978] ( Red % >= 20.67461300 ) --> NOT C4 (404)
[533956] - ( RedMean < 52.41380900 ) --> NOT C4 (82)
[533957] - ( RedMean >= 52.41380900 ) --> NOT C4 (322)
[1067914] - ( RedMean >= 52.49773800 ) --> NOT C4 (316)

-continued

| Predicting THREAT: (1 Trees) |
|---|

[1067915] - ( RedMean < 52.49773800 ) --> NOT C4 (6)
[266979] - ( Red % < 20.67461300 ) --> C4 (2)
[66745] - ( GreenMean >= 70.19668950 ) --> NOT C4 (13)
[33373] - ( RedMean < 51.05065700 ) --> NOT C4 (117)
[66746] - ( GreenMean < 51.01018550 ) --> NOT C4 (112)
[66747] - ( GreenMean >= 51.01018550 ) --> C4 (5)
[16687] - ( Yellow % >= 0.03592250 ) --> NOT C4 (90)
[33374] - ( RGBStd < 47.80018250 ) --> NOT C4 (51)
[33375] - ( RGBStd >= 47.80018250 ) --> NOT C4 (39)
[1043] - ( RedStd >= 50.30793950 ) --> NOT C4 (34)
[261] - ( GreenMean >= 75.62565250 ) --> C4 (5)
[131] - ( Black % < 15.12923250 ) --> C4 (2)
[33] - ( RGBMean >= 81.01520150 ) --> NOT C4 (298)
[66] - ( BlueStd < 47.80709650 ) --> NOT C4 (249)
[132] - ( BlueStd < 41.91957850 ) --> NOT C4 (64)
[133] - ( BlueStd >= 41.91957850 ) --> NOT C4 (185)
[266] - ( RGBMean < 94.15494150 ) --> NOT C4 (175)
[267] - ( RGBMean >= 94.15494150 ) --> NOT C4 (10)
[67] - ( BlueStd >= 47.80709650 ) --> NOT C4 (49)
[134] - ( BlueMean >= 82.78315000 ) --> NOT C4 (46)
[135] - ( BlueMean < 82.78315000 ) --> C4 (3)
[17] - ( RGBStd >= 52.36232400 ) --> C4 (2)
[9] - ( RedMean < 48.48295400 ) --> NOT C4 (1356)
[18] - ( Yellow % < 0.03146250 ) --> NOT C4 (1305)
[36] - ( Red % > 44.50125100 ) --> NOT C4 (97)
[37] - ( Red % < 44.50125100 ) --> NOT C4 (1208)
[74] - ( BlueStd < 45.50279600 ) --> NOT C4 (364)
[148] - ( RedMean >= 37.87216600 ) --> NOT C4 (264)
[149] - ( RedMean < 37.87216600 ) --> NOT C4 (100)
[75] - ( BlueStd >= 45.50279600 ) --> NOT C4 (844)
[150] - ( RGBStd >= 44.46212600 ) --> NOT C4 (838)
[300] - ( RedMean < 48.34769250 ) --> NOT C4 (831)
[600] - ( BlueStd >= 52.70366700 ) --> NOT C4 (412)
[1200] - ( BlueStd < 55.50064650 ) --> NOT C4 (195)
[1201] - ( BlueStd >= 55.50064650 ) --> NOT C4 (217)
[2402] - ( Black % < 37.13927650 ) --> NOT C4 (197)
[4804] - ( BlueStd >= 55.88707900 ) --> NOT C4 (193)
[9608] - ( BlueMean < 56.23658350 ) --> NOT C4 (46)
[9609] - ( BlueMean >= 56.23658350 ) --> NOT C4 (147)
[19218] - ( GreenMean >= 42.14803700 ) --> NOT C4 (108)
[19219] - ( GreenMean < 42.14803700 ) --> NOT C4 (39)
[4805] - ( BlueStd < 55.88707900 ) --> NOT C4 (4)
[2403] - ( Black % >= 37.13927650 ) --> NOT C4 (20)
[601] - ( BlueStd < 52.70366700 ) --> NOT C4 (419)
[1202] - ( BlueStd < 52.68909100 ) --> NOT C4 (417)
[2404] - ( Red % < 43.02504550 ) --> NOT C4 (361)
[4808] - ( Red % >= 42.25179100 ) --> NOT C4 (30)
[4809] - ( Red % < 42.25179100 ) --> NOT C4 (331)
[9618] - ( Red % < 42.24141500 ) --> NOT C4 (329)
[19236] - ( RedStd >= 47.49008550 ) --> NOT C4 (100)
[19237] - ( RedStd < 47.49008550 ) --> NOT C4 (229)
[38474] - ( GreenMean < 42.52050950 ) --> NOT C4 (79)
[38475] - ( GreenMean >= 42.52050950 ) --> NOT C4 (150)
[76950] - ( Red % < 40.27006350 ) --> NOT C4 (144)
[153900] - ( Red % >= 38.90005650 ) --> NOT C4 (15)
[153901] - ( Red % < 38.90005650 ) --> NOT C4 (129)
[307802] - ( Red % < 38.82381650 ) --> NOT C4 (127)
[615604] - ( Black % < 33.49176400 ) --> NOT C4 (54)
[615605] - ( Black % >= 33.49176400 ) --> NOT C4 (73)
[1231210] - ( BlueMean < 51.00749950 ) --> NOT C4 (71)
[2462420] - ( Red % < 34.90112650 ) --> NOT C4 (9)
[2462421] - ( Red % >= 34.90112650 ) --> NOT C4 (62)
[4924842] - ( Red % >= 34.97943300 ) --> NOT C4 (60)
[9849684] - ( Black % >= 33.68111600 ) --> NOT C4 (58)
[9849685] - ( Black % < 33.68111600 ) --> C4 (2)
[4924843] - ( Red % < 34.97943300 ) --> C4 (2)
[1231211] - ( BlueMean >= 51.00749950 ) --> C4 (2)
[307803] - ( Red % >= 38.82381650 ) --> C4 (2)
[76951] - ( Red % >= 40.27006350 ) --> C4 (6)
[9619] - ( Red % >= 42.24141500 ) --> C4 (2)
[2405] - ( Red % >= 43.02504550 ) --> NOT C4 (56)
[4810] - ( Red % > 43.17405900 ) --> NOT C4 (52)
[4811] - ( Red % < 43.17405900 ) --> C4 (4)
[1203] - ( BlueStd >= 52.68909100 ) --> C4 (2)
[301] - ( RedMean >= 48.34769250 ) --> C4 (7)
[151] - ( RGBStd < 44.46212600 ) --> C4 (6)
[19] - (Yellow % >= 0.03146250 ) --> NOT C4 (51)

-continued

| Predicting THREAT: (1 Trees) |
|---|

[38] - ( Black % < 44.57350350 ) --> NOT C4 (47)
[76] - ( Red % < 31.90947800) --> NOT C4 (7)
[77] - ( Red % >= 31.90947800 ) --> NOT C4 (40)
[154] - (Yellow % < 0.54979900 ) --> NOT C4 (36)
[308] - ( BlueStd < 45.17869600 ) --> NOT C4 (7)
[309] - ( BlueStd >= 45.17869600 ) --> NOT C4 (29)
[618] - ( RGBStd >= 47.75511750 ) --> NOT C4 (21)
[619] - ( RGBStd < 47.75511750 ) --> C4 (8)
[155] - (Yellow % >= 0.54979900 ) --> C4 (4)
[39] - ( Black % >= 44.57350350 ) --> C4 (4)
[5] - ( GreenStd >= 51.03263250 ) --> NOT C4 (191)
[10] - ( Yellow % < 0.02421300 ) --> NOT C4 (144)
[20] - ( BlueMean >= 47.87181850 ) --> NOT C4 (141)
[40] - ( RedStd >= 51.71918100 ) --> NOT C4 (45)
[41] - ( RedStd < 51.71918100 ) --> NOT C4 (96)
[82] - ( BlueStd < 53.69071950 ) --> NOT C4 (57)
[83] - ( BlueStd >= 53.69071950 ) --> NOT C4 (39)
[166] - ( RGBStd >= 51.64918700 ) --> NOT C4 (33)
[167] - ( RGBStd < 51.64918700 ) --> C4 (6)
[21] - ( BlueMean < 47.87181850 ) --> C4 (3)
[11] - ( Yellow % >= 0.02421300 ) -->C4 (47)
[22] - ( RedMean >= 60.68355200 ) --> NOT C4 (16)
[23] - ( RedMean < 60.68355200 ) --> C4 (31)
[3] - ( Red % >= 45.59520750 ) --> NOT C4 (3330)
[6] - ( Yellow % < 0.01466550 ) --> NOT C4 (3081)
[12] - ( Black % < 64.98848350 ) --> NOT C4 (2036)
[24] - ( GreenStd < 47.90018300 ) --> NOT C4 (1937)
[48] - ( Red % < 58.16014100 ) --> NOT C4 (1130)
[96] - ( RGBMean < 28.78376100 ) --> NOT C4 (123)
[97] - ( RGBMean >= 28.78376100 ) --> NOT C4 (1007)
[194] - ( BlueMean >= 28.93594150 ) --> NOT C4 (1005)
[388] - ( Black % >= 43.40800500 ) --> NOT C4 (911)
[776] - ( Red % >= 45.73560700 ) --> NOT C4 (902)
[1552] - ( Black % < 52.87984300 ) --> NOT C4 (706)
[3104] - ( Black % >= 51.76409350 ) --> NOT C4 (68)
[3105] - ( Black % < 51.76409350 ) --> NOT C4 (638)
[6210] - ( BlueMean >= 43.23308750 ) --> NOT C4 (81)
[6211] - ( BlueMean < 43.23308750 ) --> NOT C4 (557)
[12422] - ( BlueMean < 43.14976500 ) --> NOT C4 (555)
[24844] - ( BlueMean < 38.42803750 ) --> NOT C4 (380)
[49688] - ( RedMean >= 30.67255650 ) --> NOT C4 (334)
[99376] - ( RGBStd < 47.19750600 ) --> NOT C4 (328)
[198752] - ( BlueStd >= 44.62378500 ) --> NOT C4 (157)
[198753] - ( BlueStd < 44.62378500 ) --> NOT C4 (171)
[397506] - ( BlueMean < 36.43159850 ) --> NOT C4 (167)
[397507] - ( BlueMean >= 36.43159850 ) --> C4 (4)
[99377] - ( RGBStd >= 47.19750600 ) --> NOT C4 (6)
[49689] - ( RedMean < 30.67255650) --> NOT C4 (46)
[24845] - ( BlueMean >= 38.42803750 ) --> NOT C4 (175)
[49690] - ( RedStd >= 45.06529400) --> NOT C4 (87)
[49691] - ( RedStd < 45.06529400 ) --> NOT C4 (88)
[99382] - ( RedMean < 31.73246550 ) --> NOT C4 (39)
[99383] - ( RedMean >= 31.73246550 ) --> NOT C4 (49)
[198766] - ( BlueMean >= 41.89118200 ) --> NOT C4 (7)
[198767] - ( BlueMean < 41.89118200 ) --> NOT C4 (42)
[397534] - ( RedStd < 44.94667250 ) --> NOT C4 (39)
[795068] - ( BlueMean < 41.45530350 ) --> NOT C4 (36)
[1590136] - ( BlueMean >= 41.19118150 ) --> NOT C4 (7)
[1590137] - ( BlueMean < 41.19118150 ) --> NOT C4 (29)
[3180274] - ( Red % >= 47.11168700 ) --> NOT C4 (26)
[3180275] - ( Red % < 47.11168700 ) --> C4 (3)
[795069] - ( BlueMean >= 41.45530350 ) --> C4 (3)
[397535] - ( RedStd >= 44.94667250 ) --> C4 (3)
[12423] - ( BlueMean >= 43.14976500 ) --> C4 (2)
[1553] - ( Black % >= 52.87984300 ) --> NOT C4 (196)
[3106] - ( GreenMean < 33.90735800 ) --> NOT C4 (185)
[6212] - ( Black % >= 52.91334750 ) --> NOT C4 (183)
[12424] - ( RedStd >= 42.39215050 ) --> NOT C4 (111)
[12425] - ( RedStd < 42.39215050 ) --> NOT C4 (72)
[24850] - ( GreenStd < 42.26553150 ) --> NOT C4 (64)
[24851] - ( GreenStd >= 42.26553150 ) --> NOT C4 (8)
[6213] - ( Black % < 52.91334750 ) --> C4 (2)
[3107] - ( GreenMean >= 33.90735800 ) --> C4 (11)
[777] - ( Red % < 45.73560700 ) --> NOT C4 (9)
[389] - ( Black % < 43.40800500 ) --> NOT C4 (94)
[778] - ( GreenStd >= 44.41347850 ) --> NOT C4 (54)
[779] - ( GreenStd < 44.41347850 ) --> NOT C4 (40)

-continued

| Predicting THREAT: (1 Trees) |
|---|

[1558] - ( RGBStd < 46.21739000 ) --> NOT C4 (28)
[1559] - ( RGBStd >= 46.21739000 ) --> C4 (12)
[195] - ( BlueMean < 28.93594150 ) --> C4 (2)
[49] - ( Red % >= 58.16014100 ) --> NOT C4 (807)
[98] - ( GreenStd < 42.89170450 ) --> NOT C4 (707)
[196] - ( Black % < 53.84187500 ) --> NOT C4 (27)
[197] - ( Black % >= 53.84187500 ) > NOT C4 (680)
[394] - ( Black % >= 64.68735500 ) --> NOT C4 (27)
[395] - ( Black % < 64.68735500 ) --> NOT C4 (653)
[790] - ( RGBMean < 28.10519400) --> NOT C4 (595)
[1580] - ( GreenStd < 42.78296850 ) --> NOT C4 (593)
[3160] - ( BlueMean >= 28.29960050 ) --> NOT C4 (150)
[3161] - ( BlueMean < 28.29960050 ) --> NOT C4 (443)
[6322] - ( RGBStd >= 35.22638500 ) --> NOT C4 (434)
[12644] - ( BlueStd < 37.90874250 ) --> NOT C4 (62)
[12645] - ( BlueStd >= 37.90874250 ) --> NOT C4 (372)
[25290] - ( RGBStd >= 38.07899050 ) --> NOT C4 (333)
[50580] - ( RGBMean < 23.07209300 ) --> NOT C4 (21)
[50581] - ( RGBMean >= 23.07209300 ) --> NOT C4 (312)
[101162] - ( RedMean >= 22.47274750 ) --> NOT C4 (290)
[202324] - ( RedMean < 26.44887950 ) --> NOT C4 (259)
[404648] - ( BlueMean >= 24.16304400 ) --> NOT C4 (231)
[809296] - ( RGBMean < 24.47212150 ) --> NOT C4 (42)
[809297] - ( RGBMean >= 24.47212150 ) --> NOT C4 (189)
[1618594] - ( RedMean >= 24.22689100 ) --> NOT C4 (168)
[3237188] - ( RGBMean < 25.65376000 ) --> NOT C4 (103)
[3237189] - ( RGBMean >= 25.65376000 ) --> NOT C4 (65)
[1618595] - ( RedMean < 24.22689100 ) --> NOT C4 (21)
[404649] - ( BlueMean < 24.16304400 ) --> NOT C4 (28)
[202325] - ( RedMean >= 26.44887950 ) --> NOT C4 (31)
[101163] - ( RedMean < 22.47274750 ) --> NOT C4 (22)
[25291] - ( RGBStd < 38.07899050 ) --> NOT C4 (39)
[50582] - ( RedStd < 38.04919800 ) --> NOT C4 (36)
[50583] - ( RedStd >= 38.04919800 ) --> C4 (3)
[6323] - ( RGBStd < 35.22638500 ) --> NOT C4 (9)
[1581] - ( GreenStd >= 42.78296850 ) --> C4 (2)
[791] - ( RGBMean >= 28.10519400) --> NOT C4 (58)
[1582] - ( GreenStd >= 42.13297450 ) --> NOT C4 (19)
[1583] - ( GreenStd < 42.13297450 ) --> NOT C4 (39)
[3166] - ( Black % < 58.09482200 ) --> NOT C4 (30)
[3167] - ( Black % >= 58.09482200 ) --> C4 (9)
[99] - ( GreenStd >= 42.89170450 ) --> NOT C4 (100)
[198] - ( BlueStd >= 51.43109700 ) --> NOT C4 (13)
[199] - ( BlueStd < 51.43109700 ) --> NOT C4 (87)
[398] - ( RGBStd >= 43.94751350 ) --> NOT C4 (71)
[796] - ( RedMean < 30.70032950 ) --> NOT C4 (66)
[1592] - ( RedMean >= 29.93333650 ) --> NOT C4 (7)
[1593] - ( RedMean < 29.93333650 ) --> NOT C4 (59)
[3186] - ( Red % < 60.60153550 ) --> NOT C4 (29)
[3187] - ( Red % >= 60.60153550 ) --> NOT C4 (30)
[6374] - ( Red % >= 62.39068600 ) --> NOT C4 (17)
[6375] - ( Red % < 62.39068600 ) --> C4 (13)
[797] - ( RedMean >= 30.70032950 ) --> C4 (5)
[399] - ( RGBStd < 43.94751350 ) --> C4 (16)
[25] - ( GreenStd >= 47.90018300 ) --> NOT C4 (99)
[50] - (RedStd >= 47.16206350 ) --> NOT C4 (96)
[100] - ( BlueMean < 53.94523250 ) --> NOT C4 (93)
[200] - ( Black % < 41.41240100 ) --> NOT C4 (5)
[201] - ( Black % >= 41.41240100 ) --> NOT C4 (88)
[402] - ( GreenStd >= 47.94884100 ) --> NOT C4 (86)
[804] - ( RGBStd < 53.28121950 ) --> NOT C4 (84)
[1608] - ( Red % < 46.07311100 ) --> NOT C4 (6)
[1609] - ( Red % >= 46.07311100 ) --> NOT C4 (78)
[3218] - ( Black % >= 43.52703650 ) --> NOT C4 (73)
[6436] - ( BlueMed >= 13.00000000 ) --> NOT C4 (36)
[6437] - ( BlueMed < 13.00000000 ) --> NOT C4 (37)
[12874] - ( RedMean < 36.80363800 ) --> NOT C4 (19)
[12875] - ( RedMean >= 36.80363800 ) --> C4 (18)
[3219] - ( Black % < 43.52703650 ) --> C4 (5)
[805] - ( RGBStd >= 53.28121950 ) --> C4 (2)
[403] - ( GreenStd < 47.94884100 ) --> C4 (2)
[101] - ( BlueMean >= 53.94523250 ) --> C4 (3)
[51] - ( RedStd < 47.16206350 ) --> C4 (3)
[13] - ( Black % >= 64.98848350 ) --> NOT C4 (1045)
[26] - ( GreenStd < 41.43569950 ) --> NOT C4 (1024)
[52] - ( GreenStd < 37.92868250 ) --> NOT C4 (892)
[104] - ( RGBStd >= 38.03495050 ) --> NOT C4 (54)

-continued

| Predicting THREAT: (1 Trees) |
| --- |

[105] - ( RGBStd < 38.03495050 ) --> NOT C4 (838)
[210] - ( Red % >= 89.23843750 ) --> NOT C4 (16)
[211] - ( Red % < 89.23843750 ) --> NOT C4 (822)
[422] - ( Black % < 74.10862350 ) --> NOT C4 (395)
[844] - ( Black % >= 73.70447550 ) --> NOT C4 (23)
[845] - ( Black % < 73.70447550 ) --> NOT C4 (372)
[1690] - ( Red % >= 65.05397050 ) --> NOT C4 (370)
[3380] - ( Red % < 66.00984600 ) --> NOT C4 (13)
[3381] - ( Red % >= 66.00984600 ) --> NOT C4 (357)
[6762] - ( Black % >= 66.09868600 ) --> NOT C4 (350)
[13524] - ( RedMean >= 17.57113300 ) --> NOT C4 (213)
[27048] - ( Red % >= 72.55765550 ) --> NOT C4 (15)
[27049] - ( Red % < 72.55765550 ) --> NOT C4 (198)
[54098] - ( BlueStd < 39.93703450 ) --> NOT C4 (185)
[108196] - ( Red % < 72.34632500 ) --> NOT C4 (181)
[216392] - ( Red % >= 71.43363600 ) --> NOT C4 (31)
[216393] - ( Red % < 71.43363600 ) --> NOT C4 (150)
[432786] - ( BlueMean >= 21.16735350 ) --> NOT C4 (27)
[432787] - ( BlueMean < 21.16735350 ) --> NOT C4 (123)
[865574] - ( BlueMean < 20.85527150 ) --> NOT C4 (115)
[1731148] - ( BlueMean >= 20.25724800 ) --> NOT C4 (20)
[1731149] - ( BlueMean < 20.25724800 ) --> NOT C4 (95)
[3462298] - ( RedMean < 20.05789100 ) --> NOT C4 (89)
[6924596] - ( BlueStd < 34.00269100 ) --> NOT C4 (11)
[6924597] - ( BlueStd >= 34.00269100 ) --> NOT C4 (78)
[13849194] - ( RGBMean >= 19.82349700 ) --> NOT C4 (9)
[13849195] - ( RGBMean < 19.82349700 ) --> NOT C4 (69)
[27698390] - ( RGBStd < 36.33854900 ) --> NOT C4 (59)
[55396780] - ( RGBStd >= 35.63215850 ) --> NOT C4 (18)
[55396781] - ( RGBStd < 35.63215850 ) --> NOT C4 (41)
[110793562] - ( Red % < 71.37550350 ) --> NOT C4 (39)
[110793563] - ( Red % >= 71.37550350 ) --> C4 (2)
[27698391] - ( RGBStd >= 36.33854900 ) --> NOT C4 (10)
[3462299] - ( RedMean >= 20.05789100 ) --> C4 (6)
[865575] - ( BlueMean >= 20.85527150 ) --> C4 (8)
[108197] - ( Red % >= 72.34632500 ) --> C4 (4)
[54099] - ( BlueStd >= 39.93703450 ) --> NOT C4 (13)
[13525] - ( Red Mean < 17.57113300 ) --> NOT C4 (137)
[27050] - ( RedMean < 17.10107150 ) --> NOT C4 (87)
[54100] - ( BlueStd >= 42.46681600 ) --> NOT C4 (14)
[54101] - ( BlueStd < 42.46681600 ) --> NOT C4 (73)
[108202] - ( RGBStd < 34.84770050 ) --> NOT C4 (57)
[108203] - ( RGBStd >= 34.84770050 ) --> NOT C4 (16)
[27051] - ( RedMean >= 17.10107150 ) --> NOT C4 (50)
[54102] - ( RedStd >= 33.69779800 ) --> NOT C4 (38)
[108204] - ( Red % < 73.59689350 ) --> NOT C4 (27)
[108205] - ( Red % >= 73.59689350 ) --> C4 (11)
[54103] - ( RedStd < 33.69779800 ) --> C4 (12)
[6763] - ( Black % < 66.09868600 ) --> C4 (7)
[1691] - ( Red % < 65.05397050 ) --> C4 (2)
[423] - ( Black % >= 74.10862350 ) --> NOT C4 (427)
[846] - ( RGBMean < 16.67037250 ) --> NOT C4 (397)
[1692] - ( GreenStd < 35.39174850 ) --> NOT C4 (393)
[3384] - ( RedStd >= 34.45686900 ) --> NOT C4 (14)
[3385] - ( RedStd < 34.45686900 ) --> NOT C4 (379)
[6770] - ( GreenStd < 34.60126100 ) --> NOT C4 (377)
[13540] - ( Red % < 77.70377350 ) --> NOT C4 (91)
[27080] - ( RGBMean < 16.00073950 ) --> NOT C4 (76)
[27081] - ( RGBMean >= 16.00073950 ) --> NOT C4 (15)
[13541] - ( Red % >= 77.70377350 ) --> NOT C4 (286)
[27082] - ( RGBStd < 31.63435750 ) --> NOT C4 (202)
[54164] - ( BlueStd >= 32.18647800 ) --> NOT C4 (41)
[54165] - ( BlueStd < 32.18647800 ) --> NOT C4 (161)
[108330] - ( RGBStd < 30.98291200 ) --> NOT C4 (154)
[216660] - ( Black % >= 77.73876550 ) --> NOT C4 (152)
[433320] - ( BlueStd >= 25.27611950 ) --> NOT C4 (142)
[866640] - ( BlueMean < 10.15660150 ) --> NOT C4 (38)
[866641] - ( BlueMean >= 10.15660150 ) --> NOT C4 (104)
[1733282] - ( Black % < 82.35655600 ) --> NOT C4 (71)
[3466564] - ( RedStd >= 30.41704200 ) --> NOT C4 (8)
[3466565] - ( RedStd < 30.41704200 ) --> NOT C4 (63)
[6933130] - ( Red % >= 78.59946850 ) --> NOT C4 (61)
[13866260] - ( RGBStd < 30.32782150 ) --> NOT C4 (58)
[13866261] - ( RGBStd >= 30.32782150 ) --> C4 (3)
[6933131] - ( Red % < 78.59946850 ) --> C4 (2)
[1733283] - ( Black % >= 82.35655600 ) --> C4 (33)
[3466566] - ( GreenStd < 29.93382900 ) --> NOT C4 (30)

-continued

Predicting THREAT: (1 Trees)

[6933132] - ( RedStd >= 28.70312000 ) --> NOT C4 (9)
[6933133] - ( RedStd < 28.70312000 ) --> C4 (21)
[3466567] - ( GreenStd >= 29.93382900 ) --> C4 (3)
[433321] - ( BlueStd < 25.27611950 ) --> C4 (10)
[216661] - ( Black % < 77.73876550 ) --> C4 (2)
[108331] - ( RGBStd >= 30.98291200 ) --> C4 (7)
[27083] - ( RGBStd >= 31.63435750 ) --> NOT C4 (84)
[54166] - ( RGBStd >= 31.90780100 ) --> NOT C4 (73)
[108332] - ( GreenMean >= 12.01756750 ) --> NOT C4 (67)
[216664] - ( RGBMean < 13.54910200 ) --> NOT C4 (13)
[216665] - ( RGBMean >= 13.54910200 ) --> NOT C4 (54)
[433330] ( Black % < 78.90671950 ) --> NOT C4 (42)
[433331] - ( Black % >= 78.90671950 ) --> C4 (12)
[108333] - ( GreenMean < 12.01756750 ) --> C4 (6)
[54167] - ( RGBStd < 31.90780100 ) --> C4 (11)
[6771] - ( GreenStd >= 34.60126100 ) --> C4 (2)
[1693] - ( GreenStd >= 35.39174850 ) --> C4 (4)
[847] - ( RGBMean >= 16.67037250 ) --> C4 (30)
[53] - ( GreenStd >= 37.92868250 ) --> NOT C4 (132)
[106] - ( Black % < 70.04750450 ) --> NOT C4 (91)
[212] - ( Black % >= 69.01367950 ) --> NOT C4 (13)
[213] - ( Black % < 69.01367950 ) --> NOT C4 (78)
[426] - ( RedMean < 20.53832700 ) --> NOT C4 (7)
[427] - ( RedMean >= 20.53832700 ) --> NOT C4 (71)
[854] - ( Black % < 68.36993400 ) --> NOT C4 (66)
[1708] - ( BlueMean < 25.21327900 ) --> NOT C4 (52)
[3416] - ( RedMean < 23.73270800 ) --> NOT C4 (50)
[6832] - ( Black % < 66.05030800 ) --> NOT C4 (18)
[6833] - ( Black % >= 66.05030800 ) --> NOT C4 (32)
[3417] - ( RedMean >= 23.73270800 ) --> C4 (2)
[1709] - ( BlueMean >= 25.21327900 ) --> C4 (14)
[855] - ( Black % >= 68.36993400 ) --> C4 (5)
[107] - ( Black % >= 70.04750450 ) --> C4 (41)
[214] - ( GreenStd < 39.85793300 ) --> C4 (33)
[428] - ( BlueStd >= 40.15871400 ) --> NOT C4 (17)
[429] - ( BlueStd < 40.15871400 ) --> C4 (16)
[215] - ( GreenStd >= 39.85793300 ) --> C4 (8)
[27] - ( GreenStd >= 41.43569950 ) --> C4 (21)
[7] - ( Yellow % >= 0.01466550 ) --> C4 (249)
[14] - ( Red % < 48.52728250 ) --> NOT C4 (26)
[15] - ( Red % >= 48.52728250 ) --> C4 (223)
[30] - (Yellow % < 0.05884450 ) --> C4 (91)
[60] - ( BlueStd >= 45.94578350 ) --> C4 (50)
[120] - ( RedStd < 46.83117300 ) --> C4 (38)
[240] - ( Red % >= 53.21278750 ) --> NOT C4 (27)
[480] - ( Red % < 54.46098150 ) --> NOT C4 (4)
[481] - ( Red % >= 54.46098150 ) --> C4 (23)
[962] - ( Red % < 56.73616400 ) --> NOT C4 (18)
[963] - ( Red % >= 56.73616400 ) --> C4 (5)
[241] - ( Red % < 53.21278750 ) --> C4 (11)
[121] - ( RedStd >= 46.83117300 ) --> C4 (12)
[61] - ( BlueStd < 45.94578350 ) --> C4 (41)
[31] - (Yellow % >= 0.05884450 ) --> C4 (132)

| Node | Parent | Position | Left Split Definition | Score | Number Records | Entropy | Probabilities |
|---|---|---|---|---|---|---|---|
| 1 | root | root | ( Red % < 45.59520750 ) | NOT C4 | 6810 | 5,769.42588812 | 0.84948605 0.15051395 |
| 2 | 1 | left | ( GreenStd < 51.03263250 ) | NOT C4 | 3480 | 1,859.05633837 | 0.92471264 0.07528736 |
| 3 | 1 | right | ( Yellow % < 0.01466550 ) | NOT C4 | 3330 | 3,584.55795628 | 0.77087087 0.22912913 |
| 4 | 2 | left | ( RedMean >= 48.48295400 ) | NOT C4 | 3289 | 1,593.85548926 | 0.93432654 0.06567346 |
| 5 | 2 | right | ( Yellow % < 0.02421300 ) | NOT C4 | 191 | 210.88065573 | 0.75916230 0.24083770 |
| 6 | 3 | left | ( Black % < 64.98848350 ) | NOT C4 | 3081 | 2,912.05292403 | 0.81921454 0.18078546 |
| 7 | 3 | right | ( Red % < 48.52728250 ) | C4 | 249 | 229.14335095 | 0.17269076 0.82730924 |
| 8 | 4 | left | ( RGBStd < 52.36232400 ) | NOT C4 | 1933 | 727.80641599 | 0.95344025 0.04655975 |
| 9 | 4 | right | ( Yellow % < 0.03146250 ) | NOT C4 | 1356 | 838.66671504 | 0.90707965 0.09292035 |
| 10 | 5 | left | ( BlueMean >= 47.87181850 ) | NOT C4 | 144 | 123.11922742 | 0.84722222 0.15277778 |

-continued

| | | | | Predicting THREAT: (1 Trees) | | | | |
|---|---|---|---|---|---|---|---|---|
| 11 | 5 | right | ( RedMean >= 60.68355200 ) | C4 | 47 | 65.13455677 | 0.48936170 | 0.51063830 |
| 12 | 6 | left | ( GreenStd < 47.90018300 ) | NOT C4 | 2036 | 1,604.70064657 | 0.86591356 | 0.13408644 |
| 13 | 6 | right | ( GreenStd < 41.43566950 ) | NOT C4 | 1045 | 1,222.67448565 | 0.72822967 | 0.27177033 |
| 14 | 7 | left | (leaf) | NOT C4 | 26 | 33.54172389 | 0.65384615 | 0.34615385 |
| 15 | 7 | right | ( Yellow % < 0.05884450) | C4 | 223 | 160.59532097 | 0.11659193 | 0.88340807 |
| 16 | 8 | left | ( RGBMean < 81.01520150 ) | NOT C4 | 1931 | 715.49563342 | 0.95442776 | 0.04557224 |
| 17 | 8 | right | (leaf) | C4 | 2 | 0.00000000 | 0.00000000 1.00000000 | |
| 18 | 9 | left | ( Red % >= 44.50125100 ) | NOT C4 | 1305 | 735.37704086 | 0.91877395 | 0.08122605 |
| 19 | 9 | right | ( Black % < 44.57350350 ) | NOT C4 | 51 | 68.30971692 | 0.60784314 | 0.39215686 |
| 20 | 10 | left | ( RedStd >= 51.71918100 ) | NOT C4 | 141 | 111.48047296 | 0.86524823 | 0.13475177 |
| 21 | 10 | right | (leaf) | C4 | 3 | 0.00000000 | 0.00000000 1.00000000 | |
| 22 | 11 | left | (leaf) | NOT C4 | 16 | 0.00000000 | 1.00000000 0.00000000 | |
| 23 | 11 | right | (leaf) | C4 | 31 | 33.11788073 | 0.22580645 | 0.77419355 |
| 24 | 12 | left | ( Red % < 58.16014100 ) | NOT C4 | 1937 | 1,431.63672010 | 0.87867837 | 0.12132163 |
| 25 | 12 | right | ( RedStd >= 47.16206350 ) | NOT C4 | 99 | 131.85057076 | 0.61616162 | 0.38383838 |
| 26 | 13 | left | ( GreenStd < 37.92868250 ) | NOT C4 | 1024 | 1,171.01875201 | 0.74121094 | 0.25878906 |
| 27 | 13 | right | (leaf) | C4 | 21 | 13.20867245 | 0.09523810 | 0.90476190 |
| 30 | 15 | left | ( BlueStd >= 45.94578350 ) | C4 | 91 | 90.51596849 | 0.19780200 | 0.80219780 |
| 31 | 15 | right | (leaf) | C4 | 132 | 60.35881463 | 0.06060606 | 0.93939394 |
| 32 | 16 | left | ( Black % < 15.09932550 ) | NOT C4 | 1633 | 533.67259132 | 0.96142070 | 0.03857930 |
| 33 | 16 | right | ( BlueStd < 47.80709650 ) | NOT C4 | 298 | 171.75232654 | 0.91610738 | 0.08389262 |
| 36 | 18 | left | (leaf) | NOT C4 | 97 | 0.00000000 | 1.00000000 0.00000000 | |
| 37 | 18 | right | ( BlueStd < 45.50279600 ) | NOT C4 | 1208 | 718.26985716 | 0.91225166 | 0.08774834 |
| 38 | 19 | left | ( Red % < 31.90947800 ) | NOT C4 | 47 | 60.28382877 | 0.65957447 | 0.34042553 |
| 39 | 19 | right | (leaf) | C4 | 4 | 0.00000000 | 0.00000000 1.00000000 | |
| 40 | 20 | left | (leaf) | NOT C4 | 45 | 9.59093629 | 0.97777778 | 0.02222222 |
| 41 | 20 | right | ( BlueStd < 53.69071950 ) | NOT C4 | 96 | 92.65489251 | 0.81250000 | 0.18750000 |
| 48 | 24 | left | ( RGBMean < 28.78376100 ) | NOT C4 | 1130 | 716.95071744 | 0.90353982 | 0.09646018 |
| 49 | 24 | right | ( GreenStd < 42.89170450 ) | NOT C4 | 807 | 699.18949906 | 0.84386617 | 0.15613383 |
| 50 | 25 | left | ( BLueMean < 53.94523250 ) | NOT C4 | 96 | 125.95387703 | 0.63541667 | 0.36458333 |
| 51 | 25 | right | (leaf) | C4 | 3 | 0.00000000 | 0.00000000 1.00000000 | |
| 52 | 26 | left | ( RGBStd >= 38.03495050 ) | NOT C4 | 892 | 973.61796432 | 0.76457399 | 0.23542601 |
| 53 | 26 | right | ( Black % < 70.04750450 ) | NOT C4 | 132 | 179.30702222 | 0.58333333 | 0.41666667 |
| 60 | 30 | left | ( RedStd < 46.83117300 ) | C4 | 50 | 62.68694576 | 0.32000000 | 0.68000000 |
| 61 | 30 | right | (leaf) | C4 | 41 | 15.98251235 | 0.04878049 | 0.95121951 |
| 64 | 32 | left | (leaf) | NOT C4 | 540 | 99.59334192 | 0.98148148 | 0.01851852 |
| 65 | 32 | right | ( Black % >= 15.12923250 ) | NOT C4 | 1093 | 424.18472668 | 0.95150961 | 0.04849039 |
| 66 | 33 | left | ( Blue Std < 41.91957850 | NOT C4 | 249 | 102.424717 | 0.94779116 | 0.05220884 |

-continued

| | | | Predicting THREAT: (1 Trees) | | | | |
|---|---|---|---|---|---|---|---|
| 67 | 33 | right | ( BlueMean >= 82.78315000 ) | NOT C4 | 49 | 54.55270408 | 0.75510204 0.24489796 |
| 74 | 37 | left | ( RedMean >= 37.87216600 ) | NOT C4 | 364 | 143.33900002 | 0.95054945 0.04945055 |
| 75 | 37 | right | ( RGBStd >= 44.46212600 ) | NOT C4 | 844 | 564.39157075 | 0.89573460 0.10426540 |
| 76 | 38 | left | (leaf) | NOT C4 | 7 | 0.00000000 | 1.00000000 0.00000000 |
| 77 | 38 | right | ( Yellow % < 0.54979900 ) | NOT C4 | 40 | 53.84093336 | 0.60000000 0.40000000 |
| 82 | 41 | left | (leaf) | NOT C4 | 57 | 33.88411868 | 0.91228070 0.08771930 |
| 83 | 41 | right | ( RGBStd >= 51.64918700 ) | NOT C4 | 39 | 49.64810513 | 0.66666667 0.33333333 |
| 96 | 48 | left | (leaf) | NOT C4 | 123 | 20.44345066 | 0.98373984 0.01626016 |
| 97 | 48 | right | ( BlueMean >= 28.93594150 ) | NOT C4 | 1007 | 681.97207338 | 0.89374379 0.10625621 |
| 98 | 49 | left | ( Black % < 53.84187500 ) | NOT C4 | 707 | 542.88067232 | 0.87128713 0.12871287 |
| 99 | 49 | right | ( BlueStd >= 51.43109700 ) | NOT C4 | 100 | 129.48932781 | 0.65000000 0.35000000 |
| 100 | 50 | left | ( Black % < 41.41240100 ) | NOT C4 | 93 | 119.72979652 | 0.65591398 0.34408602 |
| 101 | 50 | right | (leaf) | C4 | 3 | 0.00000000 | 0.00000000 1.00000000 |
| 104 | 52 | left | (leaf) | NOT C4 | 54 | 17.10834157 | 0.96296296 0.03703704 |
| 105 | 52 | right | ( Red % >= 89.23843750 ) | NOT C4 | 838 | 939.16352283 | 0.75178998 0.24821002 |
| 106 | 53 | left | ( Black % >= 69.01367950 ) | NOT C4 | 91 | 110.66420475 | 0.70329670 0.29670330 |
| 107 | 53 | right | ( GreeStd < 39.85793300 ) | C4 | 41 | 51.22077361 | 0.31707317 0.68292683 |
| 120 | 60 | left | ( Red % >= 53.21278750 ) | NOT C4 | 38 | 51.72784108 | 0.42105263 0.57894737 |
| 121 | 60 | right | (leaf) | C4 | 12 | 0.00000000 | 0.00000000 1.00000000 |
| 130 | 65 | left | ( GreenMean < 75.62565250 ) | NOT C4 | 1091 | 412.00639091 | 0.95325390 0.04674610 |
| 131 | 65 | right | (leaf) | C4 | 2 | 0.00000000 | 0.00000000 1.00000000 |
| 132 | 66 | left | (leaf) | NOT C4 | 64 | 0.00000000 | 1.00000000 0.00000000 |
| 133 | 66 | right | ( RGBMean < 94.15494150 ) | NOT C4 | 185 | 94.10487196 | 0.92972973 0.07027027 |
| 134 | 67 | left | (leaf) | NOT C4 | 46 | 45.47704055 | 0.80434783 0.19565217 |
| 135 | 67 | right | (leaf) | C4 | 3 | 0.00000000 | 0.00000000 1.00000000 |
| 148 | 74 | left | (leaf) | NOT C4 | 264 | 71.69921022 | 0.96969697 0.03030303 |
| 149 | 74 | right | (leaf) | NOT C4 | 100 | 65.01659468 | 0.90000000 0.10000000 |
| 150 | 75 | left | ( RedMean < 48.34769250 ) | NOT C4 | 838 | 545.71742325 | 0.89976134 0.10023866 |
| 151 | 75 | right | (leaf) | C4 | 6 | 7.63817002 | 0.33333333 0.66666667 |
| 154 | 77 | left | ( BlueStd < 45.17869600 ) | NOT C4 | 36 | 45.82902012 | 0.66666667 0.33333333 |
| 155 | 77 | right | (leaf) | C4 | 4 | 0.00000000 | 0.00000000 1.00000000 |
| 166 | 83 | left | (leaf) | NOT C4 | 33 | 36.55464315 | 0.75757576 0.24242424 |
| 167 | 83 | right | (leaf) | C4 | 6 | 5.40673451 | 0.16666667 0.83333333 |
| 194 | 97 | left | ( Black % >= 43.40800500 ) | NOT C4 | 1005 | 672.97082167 | 0.89552239 0.10447761 |
| 195 | 97 | right | (Leaf) | C4 | 2 | 0.00000000 | 0.00000000 1.00000000 |
| 196 | 98 | left | (leaf) | NOT C4 | 27 | 0.00000000 | 1.00000000 0.00000000 |
| 197 | 98 | right | ( Black % >= 64.68735500 ) | NOT C4 | 680 | 535.28373098 | 0.86617647 0.13382353 |
| 198 | 99 | left | (leaf) | NOT C4 | 13 | 0.00000000 | 1.00000000 0.00000000 |

-continued

| | | | | Predicting THREAT: (1 Trees) | | | | |
|---|---|---|---|---|---|---|---|---|
| 199 | 99 | right | ( RGBStd >= 43.94751350 ) | NOT C4 | 87 | 117.26430161 | 0.59770115 | 0.40229885 |
| 200 | 100 | left | (leaf) | NOT C4 | 5 | 0.00000000 | 1.00000000 | 0.00000000 |
| 201 | 100 | right | ( GreenStd >= 47.94884100 ) | NOT C4 | 88 | 115.36479221 | 0.63636364 | 0.36363636 |
| 210 | 105 | left | (leaf) | NOT C4 | 16 | 0.00000000 | 1.00000000 | 0.00000000 |
| 211 | 105 | right | ( Black % < 74.10862350 ) | NOT C4 | 822 | 929.93159655 | 0.74695864 | 0.25304136 |
| 212 | 106 | left | (leaf) | NOT C4 | 13 | 0.00000000 | 1.00000000 | 0.00000000 |
| 213 | 106 | right | ( RedMean < 20.53832700 ) | NOT C4 | 78 | 100.62517166 | 0.65384615 | 0.34615385 |
| 214 | 107 | left | ( BlueStd >= 40.15871400 ) | C4 | 33 | 44.25152482 | 0.39393939 | 0.60606061 |
| 215 | 107 | right | (leaf) | C4 | 8 | 0.00000000 | 0.00000000 | 1.00000000 |
| 240 | 120 | left | ( Red % < 54.46098150 ) | NOT C4 | 27 | 37.09592514 | 0.55555556 | 0.44444444 |
| 241 | 120 | right | (leaf) | C4 | 11 | 6.70199414 | 0.09090909 | 0.90909091 |
| 260 | 130 | left | ( Red % >= 31.87044900 ) | NOT C4 | 1086 | 393.27581373 | 0.95580110 | 0.04419890 |
| 261 | 130 | right | (leaf) | C4 | 5 | 6.73011667 | 0.40000000 | 0.60000000 |
| 266 | 133 | left | (leaf) | NOT C4 | 175 | 70.94510275 | 0.94857143 | 0.05142857 |
| 267 | 133 | right | (leaf) | NOT C4 | 10 | 13.46023334 | 0.60000000 | 0.40000000 |
| 300 | 150 | left | ( BlueStd >= 52.70366700 ) | NOT C4 | 831 | 526.53516855 | 0.90373045 | 0.09626955 |
| 301 | 150 | right | (leaf) | C4 | 7 | 9.56071347 | 0.42857143 | 0.57142857 |
| 308 | 154 | left | (leaf) | NOT C4 | 7 | 0.00000000 | 1.00000000 | 0.00000000 |
| 309 | 154 | right | ( RGBStd >= 47.75511750 ) | NOT C4 | 29 | 39.33614485 | 0.58620690 | 0.41379310 |
| 388 | 194 | left | ( Red % >= 45.73560700 ) | NOT C4 | 911 | 569.56683640 | 0.90559824 | 0.09440176 |
| 389 | 194 | right | ( GreenStd >= 44.41347850 ) | NOT C4 | 94 | 94.62752083 | 0.79787234 | 0.20212766 |
| 394 | 197 | left | (leaf) | NOT C4 | 27 | 0.00000000 | 1.00000000 | 0.00000000 |
| 395 | 197 | right | ( RGBMean < 28.10519400 ) | NOT C4 | 653 | 527.35522137 | 0.86064319 | 0.13935681 |
| 398 | 199 | left | ( RedMean < 30.70032950 ) | NOT C4 | 71 | 90.84008412 | 0.66197183 | 0.33802817 |
| 399 | 199 | right | (leaf) | C4 | 16 | 19.87476399 | 0.31250000 | 0.68750000 |
| 402 | 201 | left | ( RGBStd < 53.28121950 ) | NOT C4 | 86 | 111.23650269 | 0.65116279 | 0.34883721 |
| 403 | 201 | right | (leaf) | C4 | 2 | 0.00000000 | 0.00000000 | 1.00000000 |
| 422 | 211 | left | ( Black % >= 73.70447550 ) | NOT C4 | 395 | 400.80019606 | 0.79493671 | 0.20506329 |
| 423 | 211 | right | ( RGBMean < 16.67037250 ) | NOT C4 | 427 | 519.80054254 | 0.70257611 | 0.29742389 |
| 426 | 213 | left | (leaf) | NOT C4 | 7 | 0.00000000 | 1.00000000 | 0.00000000 |
| 427 | 213 | right | (Black % < 68.36993400 ) | NOT C4 | 71 | 94.31666399 | 0.61971831 | 0.38028169 |
| 428 | 214 | left | (leaf) | NOT C4 | 17 | 22.07444407 | 0.64705882 | 0.35294118 |
| 429 | 214 | right | (leaf) | C4 | 16 | 12.056664516 | 0.12500000 | 0.87500000 |
| 480 | 240 | left | (leaf) | NOT C4 | 4 | 0.00000000 | 1.00000000 | 0.00000000 |
| 481 | 240 | right | ( Red % >= 56.73616400 ) | C4 | 23 | 31.84127834 | 0.47826087 | 0.52173913 |
| 520 | 260 | left | (leaf) | NOT C4 | 126 | 11.66460623 | 0.99206349 | 0.00793651 |
| 521 | 260 | right | ( RedStd < 50.30793950 ) | NOT C4 | 960 | 375.23831364 | 0.95104167 | 0.04895833 |
| 600 | 300 | left | ( BlueStd < 55.50064650 ) | NOT C4 | 412 | 204.62630691 | 0.93203883 | 0.06796117 |

-continued

| | | | Predicting THREAT: (1 Trees) | | | | |
|---|---|---|---|---|---|---|---|
| 601 | 300 | right | ( BlueStd < 52.68909100 ) | NOT C4 | 419 | 314.27088769 | 0.87589499 0.12410501 |
| 618 | 309 | left | (leaf) | NOT C4 | 21 | 23.05272415 | 0.76190476 0.23809524 |
| 619 | 309 | right | (leaf) | C4 | 8 | 6.02832258 | 0.12500000 0.87500000 |
| 776 | 388 | left | ( Black % < 52.87984300 ) | NOT C4 | 902 | 549.56351962 | 0.90909091 0.09090909 |
| 777 | 388 | right | (leaf) | NOT C4 | 9 | 12.36530838 | 0.55555556 0.44444444 |
| 778 | 389 | left | (leaf) | NOT C4 | 54 | 28.51762160 | 0.92592593 0.07407407 |
| 779 | 389 | right | ( RGBStd < 46.21739000 ) | NOT C4 | 40 | 52.92505905 | 0.62500000 0.37500000 |
| 790 | 395 | left | ( GreenStd < 42.78296850 ) | NOT C4 | 595 | 454.64037415 | 0.87226891 0.12773109 |
| 791 | 395 | right | ( GreenStd >= 42.13297450 ) | NOT C4 | 58 | 66.30667324 | 0.74137931 0.25862069 |
| 796 | 398 | left | ( RedMean >= 29.93333650 ) | NOT C4 | 66 | 80.97012653 | 0.69696970 0.30303030 |
| 797 | 398 | right | (leaf) | C4 | 5 | 5.00402424 | 0.20000000 0.80000000 |
| 804 | 402 | left | ( Red % < 46.07311100 ) | NOT C4 | 84 | 106.93438027 | 0.66666667 0.33333333 |
| 805 | 402 | right | (leaf) | C4 | 2 | 0.00000000 | 0.00000000 1.00000000 |
| 844 | 422 | left | (leaf) | NOT C4 | 23 | 0.00000000 | 1.00000000 0.00000000 |
| 845 | 422 | right | ( Red % >= 65.05397050 ) | NOT C4 | 372 | 389.88212303 | 0.78225806 0.21774194 |
| 846 | 423 | left | ( GreenStd < 35.39174850 ) | NOT C4 | 397 | 462.72910096 | 0.73047859 0.26952141 |
| 847 | 423 | right | (leaf) | C4 | 30 | 38.19085010 | 0.33333333 0.66666667 |
| 854 | 427 | left | ( BlueMean < 25.21327900 ) | NOT C4 | 66 | 84.01987021 | 0.66666667 0.33333333 |
| 855 | 427 | right | (leaf) | C4 | 5 | 0.00000000 | 0.00000000 1.00000000 |
| 962 | 481 | left | (leaf) | NOT C4 | 18 | 24.05694520 | 0.61111111 0.38888889 |
| 963 | 481 | right | (leaf) | C4 | 5 | 0.00000000 | 0.00000000 1.00000000 |
| 1042 | 521 | left | ( RedStd >= 49.63398000 ) | NOT C4 | 926 | 335.77604143 | 0.95572354 0.04427646 |
| 1043 | 521 | right | (leaf) | NOT C4 | 34 | 31.68794947 | 0.82352941 0.17647059 |
| 1200 | 600 | left | (leaf) | NOT C4 | 195 | 53.58834252 | 0.96923077 0.03076923 |
| 1201 | 600 | right | ( Black % < 37.13927650 ) | NOT C4 | 217 | 142.39975565 | 0.89861751 0.10138249 |
| 1202 | 601 | left | ( Red % < 43.02504550 ) | NOT C4 | 417 | 305.85601197 | 0.88009592 0.11990408 |
| 1203 | 601 | right | (leaf) | C4 | 2 | 0.00000000 | 0.00000000 1.00000000 |
| 1552 | 776 | left | ( Black % >= 51.76409350 ) | NOT C4 | 706 | 381.38832956 | 0.92351275 0.07648725 |
| 1553 | 776 | right | ( GreenMean < 33.90735800 ) | NOT C4 | 196 | 160.76559677 | 0.85714286 0.14285714 |
| 1558 | 779 | left | (leaf) | NOT C4 | 28 | 31.49076810 | 0.75000000 0.25000000 |
| 1559 | 779 | right | (leaf) | C4 | 12 | 15.27634004 | 0.33333333 0.66666667 |
| 1580 | 790 | left | ( BlueMean >= 28.28960050 ) | NOT C4 | 593 | 446.36269269 | 0.87521079 0.12478921 |
| 1581 | 790 | right | (leaf) | C4 | 2 | 0.00000000 | 0.00000000 1.00000000 |
| 1582 | 791 | left | (leaf) | NOT C4 | 19 | 0.00000000 | 1.00000000 0.00000000 |
| 1583 | 791 | right | ( Black % < 58.09482200 ) | NOT C4 | 39 | 51.96971851 | 0.61538462 0.38461538 |
| 1592 | 796 | left | (leaf) | NOT C4 | 7 | 0.00000000 | 1.00000000 0.00000000 |
| 1593 | 796 | right | ( Red % < 60.60153550 ) | NOT C4 | 59 | 75.56231904 | 0.66101695 0.33898305 |
| 1608 | 804 | left | (leaf) | NOT C4 | 6 | 0.00000000 | 1.00000000 0.00000000 |

-continued

Predicting THREAT: (1 Trees)

| | | | | | | | |
|---|---|---|---|---|---|---|---|
| 1609 | 804 | right | ( Black % >= 43.52703650 ) | NOT C4 | 78 | 101.84082385 | 0.64102564 0.35897436 |
| 1690 | 845 | left | ( Red % < 66.00984600 ) | NOT C4 | 370 | 383.74532199 | 0.78648649 0.21351351 |
| 1691 | 845 | right | (leaf) | C4 | 2 | 0.00000000 | 0.00000000 1.00000000 |
| 1692 | 846 | left | ( RedStd >= 34.45686900 ) | NOT C4 | 393 | 452.12924803 | 0.73791349 0.26208651 |
| 1693 | 846 | right | (leaf) | C4 | 4 | 0.00000000 | 0.00000000 1.00000000 |
| 1708 | 854 | left | ( RedMean < 23.73270800 ) | NOT C4 | 52 | 58.48285504 | 0.75000000 0.25000000 |
| 1709 | 854 | right | (leaf) | C4 | 14 | 18.24918371 | 0.35714286 0.64285714 |
| 2084 | 1042 | left | (leaf) | NOT C4 | 83 | 0.00000000 | 1.00000000 0.00000000 |
| 2085 | 1042 | right | ( RedStd < 43.81623850 ) | NOT C4 | 843 | 327.89117470 | 0.95136418 0.04863582 |
| 2402 | 1201 | left | ( BlueStd >= 55.88707900 ) | NOT C4 | 197 | 106.08232899 | 0.92385787 0.07614213 |
| 2403 | 1201 | right | (leaf) | NOT C4 | 20 | 25.89786556 | 0.65000000 0.35000000 |
| 2404 | 1202 | left | ( Red % >= 42.25179100 ) | NOT C4 | 361 | 234.27015383 | 0.90027701 0.09972299 |
| 2405 | 1202 | right | ( Red % >= 43.17405900 ) | NOT C4 | 56 | 62.98153620 | 0.75000000 0.25000000 |
| 3104 | 1552 | left | (leaf) | NOT C4 | 68 | 0.00000000 | 1.00000000 0.00000000 |
| 3105 | 1552 | right | ( BlueMean >= 43.23308750 ) | NOT C4 | 638 | 369.98502458 | 0.91536050 0.08463950 |
| 3106 | 1553 | left | ( Black % >= 52.91334750 ) | NOT C4 | 185 | 130.90552457 | 0.88648649 0.11351351 |
| 3107 | 1553 | right | (leaf) | C4 | 11 | 14.42059903 | 0.36363636 0.63636364 |
| 3160 | 1580 | left | (leaf) | NOT C4 | 150 | 73.47900804 | 0.93333333 0.06666667 |
| 3161 | 1580 | right | ( RGBStd >= 35.22638500 ) | NOT C4 | 443 | 365.91333814 | 0.85553047 0.14446953 |
| 3166 | 1583 | left | (leaf) | NOT C4 | 30 | 34.79491029 | 0.73333333 0.26666667 |
| 3167 | 1583 | right | (leaf) | C4 | 9 | 9.53471158 | 0.22222222 0.77777778 |
| 3186 | 1593 | left | (leaf) | NOT C4 | 29 | 29.56931058 | 0.79310345 0.20689655 |
| 3187 | 1593 | right | ( Red % >= 62.39068600 ) | NOT C4 | 30 | 41.45539856 | 0.53333333 0.46666667 |
| 3218 | 1609 | left | ( BlueMed >= 13.00000000 ) | NOT C4 | 73 | 92.46210534 | 0.67123288 0.32876712 |
| 3219 | 1609 | right | (leaf) | C4 | 5 | 5.00402424 | 0.20000000 0.80000000 |
| 3380 | 1690 | left | (leaf) | NOT C4 | 13 | 0.00000000 | 1.00000000 0.00000000 |
| 3381 | 1690 | right | ( Black % >= 66.09868600 ) | NOT C4 | 357 | 377.37324829 | 0.77871148 0.22128852 |
| 3384 | 1692 | left | (leaf) | NOT C4 | 14 | 0.00000000 | 1.00000000 0.00000000 |
| 3385 | 1692 | right | ( GreenStd < 34.60126100 ) | NOT C4 | 379 | 443.43699400 | 0.72823219 0.27176781 |
| 3416 | 1708 | left | ( Black % < 66.05030800 ) | NOT C4 | 50 | 52.69079614 | 0.78000000 0.22000000 |
| 3417 | 1708 | right | (leaf) | C4 | 2 | 0.00000000 | 0.00000000 1.00000000 |
| 4170 | 2085 | left | (leaf) | NOT C4 | 66 | 0.00000000 | 1.00000000 0.00000000 |
| 4171 | 2085 | right | ( Black % < 15.87751300 ) | NOT C4 | 777 | 321.03066023 | 0.94723295 0.05276705 |
| 4804 | 2402 | left | ( BlueMean < 56.23658350 ) | NOT C4 | 193 | 95.24526330 | 0.93264249 0.06735751 |
| 4805 | 2402 | right | (leaf) | NOT C4 | 4 | 5.54517744 | 0.50000000 0.50000000 |
| 4808 | 2404 | left | (leaf) | NOT C4 | 30 | 0.00000000 | 1.00000000 0.00000000 |
| 4809 | 2404 | right | ( Red % < 42.24141500 ) | NOT C4 | 331 | 227.67354069 | 0.89123867 0.10876133 |
| 4810 | 2405 | left | (leaf) | NOT C4 | 52 | 50.91339694 | 0.80769231 0.19230769 |

-continued

Predicting THREAT: (1 Trees)

| | | | | | | | |
|---|---|---|---|---|---|---|---|
| 4811 | 2405 | right | (leaf) | C4 | 4 | 0.00000000 | 0.00000000 1.00000000 |
| 6210 | 3105 | left | (leaf) | NOT C4 | 81 | 18.75541364 | 0.97530864 0.02469136 |
| 6211 | 3105 | right | ( BlueMean < 43.14976500 ) | NOT C4 | 557 | 345.60431698 | 0.90664273 0.09335727 |
| 6212 | 3106 | left | ( RedStd >= 42.39215050 ) | NOT C4 | 183 | 122.02706241 | 0.89617486 0.10382514 |
| 6213 | 3106 | right | (leaf) | NOT C4 | 2 | 0.00000000 | 0.00000000 1.00000000 |
| 6322 | 3161 | left | ( BlueStd < 37.90874250 ) | NOT C4 | 434 | 348.73797167 | 0.86175115 0.13824885 |
| 6323 | 3161 | right | (leaf) | NOT C4 | 9 | 12.36530838 | 0.55555556 0.44444444 |
| 6374 | 3187 | left | (leaf) | NOT C4 | 17 | 20.59711498 | 0.70588235 0.29411765 |
| 6375 | 3187 | right | (leaf) | C4 | 13 | 16.04828601 | 0.30769231 0.69230769 |
| 6436 | 3218 | left | (leaf) | NOT C4 | 36 | 38.13884633 | 0.77777778 0.22222222 |
| 6437 | 3218 | right | ( RedMean < 36.80363800 ) | NOT C4 | 37 | 50.61514404 | 0.56756757 0.43243243 |
| 6762 | 3381 | left | ( RedMean >= 17.57113300 ) | NOT C4 | 350 | 358.44043130 | 0.79142857 0.20857143 |
| 6763 | 3381 | right | (leaf) | C4 | 7 | 5.74162846 | 0.14285714 0.85714286 |
| 6770 | 3385 | left | ( Red % < 77.70377350 ) | NOT C4 | 377 | 438.19724906 | 0.73209549 0.26790451 |
| 6771 | 3385 | right | (leaf) | C4 | 2 | 0.00000000 | 0.00000000 1.00000000 |
| 6832 | 3416 | left | (leaf) | NOT C4 | 18 | 7.72412959 | 0.94444444 0.05555556 |
| 6833 | 3416 | right | (leaf) | NOT C4 | 32 | 39.74952797 | 0.68750000 0.31250000 |
| 8342 | 4171 | left | (leaf) | NOT C4 | 59 | 0.00000000 | 1.00000000 0.00000000 |
| 8343 | 4171 | right | ( Yellow % < 0.03592250 ) | NOT C4 | 718 | 314.37048816 | 0.94289694 0.05710306 |
| 9608 | 4804 | left | (leaf) | NOT C4 | 46 | 0.00000000 | 1.00000000 0.00000000 |
| 9609 | 4804 | right | ( GreenMean >= 42.14803700 ) | NOT C4 | 147 | 87.87743083 | 0.91156463 0.08843537 |
| 9618 | 4809 | left | ( RedStd >= 47.49008550 ) | NOT C4 | 329 | 218.69802409 | 0.89665653 0.10334347 |
| 9619 | 4809 | right | (leaf) | C4 | 2 | 0.00000000 | 0.00000000 1.00000000 |
| 12422 | 6211 | left | ( BlueMean < 38.42803750 ) | NOT C4 | 555 | 336.04829215 | 0.90990991 0.09009009 |
| 12423 | 6211 | right | (leaf) | C4 | 2 | 0.00000000 | 0.00000000 1.00000000 |
| 12424 | 6212 | left | (leaf) | NOT C4 | 111 | 52.23965558 | 0.93693694 0.06306306 |
| 12425 | 6212 | right | ( GreenStd < 42.26553150 ) | NOT C4 | 72 | 64.88081408 | 0.83333333 0.16666667 |
| 12644 | 6322 | left | (leaf) | NOT C4 | 62 | 17.67072756 | 0.96774194 0.03225806 |
| 12645 | 6322 | right | ( RGBStd >= 38.07899050 ) | NOT C4 | 372 | 322.02684321 | 0.84408602 0.15591398 |
| 12874 | 6437 | left | (leaf) | NOT C4 | 19 | 19.55682029 | 0.78947368 0.21052632 |
| 12875 | 6437 | right | (leaf) | C4 | 18 | 22.91451006 | 0.33333333 0.66666667 |
| 13524 | 6762 | left | ( Red % >= 72.55765550 ) | NOT C4 | 213 | 193.54009369 | 0.83098592 0.16901408 |
| 13525 | 6762 | right | ( RedMean < 17.10107150 ) | NOT C4 | 137 | 159.83281094 | 0.72992701 0.27007299 |
| 13540 | 6770 | left | ( RGBMean < 16.00073950 ) | NOT C4 | 91 | 84.63037404 | 0.82417582 0.17582418 |
| 13541 | 6770 | right | ( RGBStd < 31.63435750 ) | NOT C4 | 286 | 348.04802915 | 0.70279720 0.29720280 |
| 16686 | 8343 | left | ( RedMean >= 51.05065700 ) | NOT C4 | 628 | 241.02406446 | 0.95222930 0.04777070 |
| 16687 | 8343 | right | ( RGBStd < 47.80018250 ) | NOT C4 | 90 | 66.83928397 | 0.87777778 0.12222222 |
| 19218 | 9609 | left | (leaf) | NOT C4 | 108 | 46.34477752 | 0.94444444 0.05555556 |

-continued

| | | | | Predicting THREAT: (1 Trees) | | | | |
|---|---|---|---|---|---|---|---|---|
| 19219 | 9609 | right | (leaf) | NOT C4 | 39 | 36.70796853 | 0.82051282 | 0.17948718 |
| 19236 | 9618 | left | (leaf) | NOT C4 | 100 | 33.58882955 | 0.96000000 | 0.04000000 |
| 19237 | 9618 | right | ( GreenMean < 42.52050950 ) | NOT C4 | 229 | 177.83751449 | 0.86899563 | 0.13100437 |
| 24844 | 12422 | left | ( RedMean >= 30.67255650 ) | NOT C4 | 380 | 189.64691759 | 0.93157895 | 0.06842105 |
| 24845 | 12422 | right | ( ReeStd >= 45.06529400 ) | NOT C4 | 175 | 139.90999630 | 0.86285714 | 0.13714286 |
| 24850 | 12425 | left | (leaf) | NOT C4 | 64 | 48.22658064 | 0.87500000 | 0.12500000 |
| 24851 | 12425 | right | (leaf) | NOT C4 | 8 | 11.09035489 | 0.50000000 | 0.50000000 |
| 25290 | 12645 | left | ( RGBMean < 23.07209300 ) | NOT C4 | 333 | 263.75803769 | 0.86486486 | 0.13513514 |
| 25291 | 12645 | right | ( RedStd < 38.04919800 ) | NOT C4 | 39 | 49.64810513 | 0.66666667 | 0.33333333 |
| 27048 | 13524 | left | (leaf) | NOT C4 | 15 | 0.00000000 | 1.00000000 | 0.00000000 |
| 27049 | 13524 | right | ( BlueStd < 39.93703450 ) | NOT C4 | 198 | 187.75916797 | 0.81818182 | 0.18181818 |
| 27050 | 13525 | left | ( BlueStd >= 42.46681600 ) | NOT C4 | 87 | 76.76732901 | 0.83908046 | 0.16091954 |
| 27051 | 13525 | right | ( RedStd >= 33.69779800 ) | NOT C4 | 50 | 68.99437585 | 0.54000000 | 0.46000000 |
| 27080 | 13540 | left | (leaf) | NOT C4 | 76 | 59.18533992 | 0.86842105 | 0.13157895 |
| 27081 | 13540 | right | (leaf) | NOT C4 | 15 | 20.19035001 | 0.60000000 | 0.40000000 |
| 27082 | 13541 | left | ( BlueStd >= 32.18647800 ) | NOT C4 | 202 | 226.07817087 | 0.75247525 | 0.24752475 |
| 27083 | 13541 | right | ( RGBStd >= 31.90780100 ) | NOT C4 | 84 | 114.10446869 | 0.58333333 | 0.41666667 |
| 33372 | 16686 | left | ( GreenMean < 70.19668950 ) | NOT C4 | 511 | 149.13537651 | 0.96673190 | 0.03326810 |
| 33373 | 16686 | right | ( GreenMean < 51.01018550 ) | NOT C4 | 117 | 81.62671043 | 0.88888889 | 0.11111111 |
| 33374 | 16687 | left | (leaf) | NOT C4 | 51 | 9.843691400 | 0.98039216 | 0.01960784 |
| 33375 | 16687 | right | (leaf) | NOT C4 | 39 | 44.40294840 | 0.74358974 | 0.25641026 |
| 38474 | 19237 | left | (leaf) | NOT C4 | 79 | 31.65918877 | 0.94936709 | 0.05063291 |
| 38475 | 19237 | right | ( Red % < 40.27006350 ) | NOT C4 | 150 | 138.33973998 | 0.82666667 | 0.17333333 |
| 49688 | 24844 | left | ( RGBStd < 47.19750600 ) | NOT C4 | 334 | 134.36920497 | 0.94910180 | 0.05089820 |
| 49689 | 24844 | right | (leaf) | NOT C4 | 46 | 45.47704055 | 0.80434783 | 0.19565217 |
| 49690 | 24845 | left | (leaf) | NOT C4 | 87 | 38.27167697 | 0.94252874 | 0.05747126 |
| 49691 | 24845 | right | ( RedMean < 31.73246550 ) | NOT C4 | 88 | 91.81590051 | 0.78409091 | 0.21590909 |
| 50580 | 25290 | left | (leaf) | NOT C4 | 21 | 0.00000000 | 1.00000000 | 0.00000000 |
| 50581 | 25290 | right | ( RedMean >= 22.47274750 ) | NOT C4 | 312 | 257.44358153 | 0.85576923 | 0.14423077 |
| 50582 | 25291 | left | (leaf) | NOT C4 | 36 | 42.54064173 | 0.72222222 | 0.27777778 |
| 50583 | 25291 | right | (leaf) | C4 | 3 | 0.00000000 | 0.00000000 | 1.00000000 |
| 54098 | 27049 | left | ( Red % < 72.34632500 ) | NOT C4 | 185 | 163.99802613 | 0.83783784 | 0.16216216 |
| 54099 | 27049 | right | (leaf) | NOT C4 | 13 | 17.94482758 | 0.53846154 | 0.46153846 |
| 54100 | 27050 | left | (leaf) | NOT C4 | 14 | 0.00000000 | 1.00000000 | 0.00000000 |
| 54101 | 27050 | right | ( RGBStd < 34.84770050 ) | NOT C4 | 73 | 71.36405480 | 0.80821918 | 0.19178082 |
| 54102 | 27051 | left | ( Red % < 73.59689350 ) | NOT C4 | 38 | 47.39776857 | 0.68421053 | 0.31578947 |
| 54103 | 27051 | right | (leaf) | C4 | 12 | 6.88406359 | 0.08333333 | 0.91666667 |
| 54164 | 27082 | left | (leaf) | NOT C4 | 41 | 21.46468760 | 0.92682927 | 0.07317073 |

-continued

| | | | | | | | | Predicting THREAT: (1 Trees) |
|---|---|---|---|---|---|---|---|
| 54165 | 27082 | right | ( RGBStd < 30.98291200 ) | NOT C4 | 161 | 194.44508473 | 0.70807453 0.29192547 |
| 54166 | 27083 | left | ( GreenMean >= 12.01756750 ) | NOT C4 | 73 | 93.82799012 | 0.65753425 0.34246575 |
| 54167 | 27083 | right | (leaf) | C4 | 11 | 6.70199414 | 0.09090909 0.90909091 |
| 66744 | 33372 | left | ( Red % < 20.61720300 ) | NOT C4 | 498 | 127.60588179 | 0.97188755 0.02811245 |
| 66745 | 33372 | right | (leaf) | NOT C4 | 13 | 14.04530770 | 0.76923077 0.23076923 |
| 66746 | 33373 | left | (leaf) | NOT C4 | 112 | 62.63953320 | 0.91964286 0.08035714 |
| 66747 | 33373 | right | (leaf) | C4 | 5 | 5.00402424 | 0.20000000 0.80000000 |
| 76950 | 38475 | left | ( Red % >= 38.90005650 ) | NOT C4 | 144 | 123.11922742 | 0.84722222 |
| 76951 | 38475 | right | (leaf) | C4 | 6 | 7.63817002 | 0.33333333 0.66666667 |
| 99376 | 49688 | left | ( BlueStd >= 44.62378500 ) | NOT C4 | 328 | 121.85222379 | 0.95426829 0.04573171 |
| 99377 | 49688 | right | (leaf) | NOT C4 | 6 | 7.63817002 | 0.66666667 0.33333333 |
| 99382 | 49691 | left | (leaf) | NOT C4 | 39 | 15.77729414 | 0.94871795 0.05128205 |
| 99383 | 49691 | right | ( BlueMean >= 41.89118200 ) | NOT C4 | 49 | 63.26203774 | 0.65306122 0.34693878 |
| 101162 | 50581 | left | ( Red Mean < 26.44887950 ) | NOT C4 | 290 | 221.42792850 | 0.87241379 0.12758621 |
| 101163 | 50581 | right | (leaf) | NOT C4 | 22 | 28.84119805 | 0.63636364 0.36363636 |
| 108196 | 54098 | left | ( Red % >= 71.43363600 ) | NOT C4 | 181 | 152.49933301 | 0.85082873 0.14917127 |
| 108197 | 54098 | right | (leaf) | C4 | 4 | 4.49868116 | 0.25000000 0.75000000 |
| 108202 | 54101 | left | (leaf) | NOT C4 | 57 | 42.46280190 | 0.87719298 0.12280702 |
| 108203 | 54101 | right | (leaf) | NOT C4 | 16 | 21.93005463 | 0.56250000 0.43750000 |
| 108204 | 54102 | left | (leaf) | NOT C4 | 27 | 18.83693318 | 0.88888889 0.11111111 |
| 108205 | 54102 | right | (leaf) | C4 | 11 | 10.43106489 | 0.18181818 0.81818182 |
| 108330 | 54165 | left | ( Black % >= 77.73876550 ) | NOT C4 | 154 | 178.47884504 | 0.73376623 0.26623377 |
| 108331 | 54165 | right | (leaf) | C4 | 7 | 5.74162846 | 0.14285714 0.85714286 |
| 108332 | 54166 | left | ( RGBMean < 13.54910200 ) | NOT C4 | 67 | 81.68564550 | 0.70149254 0.29850746 |
| 108333 | 54166 | right | (leaf) | C4 | 6 | 5.40673451 | 0.16666667 0.83333333 |
| 133488 | 66744 | left | (leaf) | NOT C4 | 92 | 0.00000000 | 1.00000000 0.00000000 |
| 133489 | 66744 | right | ( Red % >= 20.67461300 ) | NOT C4 | 406 | 121.79587797 | 0.96551724 0.03448276 |
| 153900 | 76950 | left | (Leaf) | NOT C4 | 15 | 0.00000000 | 1.00000000 0.00000000 |
| 153901 | 76950 | right | ( Red % < 38.82381650 ) | NOT C4 | 129 | 117.84036180 | 0.82945736 0.17054264 |
| 198752 | 99376 | left | (leaf) | NOT C4 | 157 | 21.42680791 | 0.98726115 0.01273885 |
| 198753 | 99376 | right | ( BlueMean < 36.43159850 ) | NOT C4 | 171 | 91.98022259 | 0.92397661 0.07602339 |
| 198766 | 99383 | left | (leaf) | NOT C4 | 7 | 0.00000000 | 1.00000000 0.00000000 |
| 198767 | 99383 | right | ( RedStd < 44.94667250 ) | NOT C4 | 42 | 56.69120299 | 0.59523810 0.40476190 |
| 202324 | 101162 | left | ( BlueMean >= 24.16304400 ) | NOT C4 | 259 | 177.43650113 | 0.89189189 0.10810811 |
| 202325 | 101162 | right | (leaf) | NOT C4 | 31 | 37.35129634 | 0.70967742 0.29032258 |
| 216392 | 108196 | left | (leaf) | NOT C4 | 31 | 0.00000000 | 1.00000000 0.00000000 |
| 216393 | 108196 | right | ( BlueMean >= 21.16735350 ) | NOT C4 | 150 | 141.41804604 | 0.82000000 0.18000000 |
| 216660 | 108330 | left | ( BlueStd >= 25.27611950 ) | NOT C4 | 152 | 173.11222291 | 0.74342105 0.25657895 |

-continued

| | | | | Predicting THREAT: (1 Trees) | | | |
|---|---|---|---|---|---|---|---|
| 216661 | 108330 | right | (leaf) | C4 | 2 | 0.00000000 | 0.00000000 1.00000000 |
| 216664 | 108332 | left | (leaf) | NOT C4 | 13 | 7.05092370 | 0.92307692 0.07692308 |
| 216665 | 108332 | right | ( Black % < 78.90671950 ) | NOT C4 | 54 | 70.04723152 | 0.64814815 0.35185185 |
| 266978 | 133489 | left | ( RedMean < 52.41380900 ) | NOT C4 | 404 | 108.03617940 | 0.97029703 0.02970297 |
| 266979 | 133489 | right | (leaf) | C4 | 2 | 0.00000000 | 0.00000000 1.00000000 |
| 307802 | 153901 | left | ( Black % < 33.49176400 ) | NOT C4 | 127 | 110.60885844 | 0.84251969 0.15748031 |
| 307803 | 153901 | right | (leaf) | C4 | 2 | 0.00000000 | 0.00000000 1.00000000 |
| 397506 | 198753 | left | (leaf) | NOT C4 | 167 | 75.69704861 | 0.94011976 0.05988024 |
| 397507 | 198753 | right | (leaf) | C4 | 4 | 4.49868116 | 0.25000000 0.75000000 |
| 397534 | 198767 | left | ( BlueMean < 41.45530350 ) | NOT C4 | 39 | 50.92041193 | 0.64102564 0.35897436 |
| 397535 | 198767 | right | (leaf) | C4 | 3 | 0.00000000 | 0.00000000 1.00000000 |
| 404648 | 202324 | left | ( RGBMean < 24.47212150 ) | NOT C4 | 231 | 136.08355899 | 0.91341991 0.08658009 |
| 404649 | 202324 | right | (leaf) | NOT C4 | 28 | 33.50309696 | 0.71428571 0.28571429 |
| 432786 | 216393 | left | (leaf) | NOT C4 | 27 | 8.55417079 | 0.96296296 0.03703704 |
| 432787 | 216393 | right | ( BlueMean < 20.85527150 ) | NOT C4 | 123 | 126.88240161 | 0.78861789 0.21138211 |
| 433320 | 216660 | left | ( BlueMean < 10.15660150 ) | NOT C4 | 142 | 153.97154698 | 0.76760563 0.23239437 |
| 433321 | 216660 | right | (leaf) | C4 | 10 | 13.46023334 | 0.40000000 0.60000000 |
| 433330 | 216665 | left | (leaf) | NOT C4 | 42 | 46.10544830 | 0.76190476 0.23809524 |
| 433331 | 216665 | right | (leaf) | C4 | 12 | 13.49604347 | 0.25000000 0.75000000 |
| 533956 | 266978 | left | (leaf) | NOT C4 | 82 | 0.00000000 | 1.00000000 0.00000000 |
| 533957 | 266978 | right | ( RedMean >= 52.49773800 ) | NOT C4 | 322 | 102.49861130 | 0.96273292 0.03726708 |
| 615604 | 307802 | left | (Leaf) | NOT C4 | 54 | 28.51762160 | 0.92592593 0.07407407 |
| 615605 | 307802 | right | ( BlueMean < 51.00749950 ) | NOT C4 | 73 | 76.77639476 | 0.78082192 0.21917808 |
| 795068 | 397534 | left | ( BlueMean >= 41.19118150 ) | NOT C4 | 36 | 44.31587632 | 0.69444444 0.30555556 |
| 795069 | 397534 | right | (leaf) | C4 | 3 | 0.00000000 | 0.00000000 1.00000000 |
| 809296 | 404648 | left | (leaf) | NOT C4 | 42 | 0.00000000 | 1.00000000 0.00000000 |
| 809297 | 404648 | right | ( RedMean >= 24.22689100 ) | NOT C4 | 189 | 127.64531511 | 0.89417989 0.10582011 |
| 865574 | 432787 | left | ( BlueMean >= 20.25724800 ) | NOT C4 | 115 | 109.32502807 | 0.81739130 0.18260870 |
| 865575 | 432787 | right | (leaf) | C4 | 8 | 10.58501181 | 0.37500000 0.62500000 |
| 866640 | 433320 | left | (leaf) | NOT C4 | 38 | 15.67059585 | 0.94736842 0.05263158 |
| 866641 | 433320 | right | ( Black % < 82.35655600 ) | NOT C4 | 104 | 126.71902194 | 0.70192308 0.29807692 |
| 1067914 | 533957 | left | (leaf) | NOT C4 | 316 | 88.74329473 | 0.96835443 0.03164557 |
| 1067915 | 533957 | right | (leaf) | NOT C4 | 6 | 7.63817002 | 0.66666667 0.33333333 |
| 1231210 | 615605 | left | ( Red % < 34.90112650 ) | NOT C4 | 71 | 70.49909278 | 0.80281690 0.19718310 |
| 1231211 | 615605 | right | (leaf) | C4 | 2 | 0.00000000 | 0.00000000 1.00000000 |
| 1590136 | 795068 | left | (leaf) | NOT C4 | 7 | 0.00000000 | 1.00000000 0.00000000 |
| 1590137 | 795068 | right | ( Red % >= 47.11168700 ) | NOT C4 | 29 | 38.49607885 | 0.62068966 0.37931034 |
| 1618594 | 809297 | left | ( RGBMean < 25.65376000 ) | NOT C4 | 168 | 91.50142754 | 0.92261905 0.07738095 |

-continued

| | | | | Predicting THREAT: (1 Trees) | | | |
|---|---|---|---|---|---|---|---|
| 1618595 | 809297 | right | (leaf) | NOT C4 | 21 | 26.73359507 | 0.66666667 0.33333333 |
| 1731148 | 865574 | left | (leaf) | NOT C4 | 20 | 0.00000000 | 1.00000000 0.00000000 |
| 1731149 | 865574 | right | ( RedMean < 20.05789100 ) | NOT C4 | 95 | 100.36503323 | 0.77894737 0.22105263 |
| 1733282 | 866641 | left | ( RedStd >= 30.41704200 ) | NOT C4 | 71 | 70.49909278 | 0.80281690 0.19718310 |
| 1733283 | 866641 | right | ( GreenStd < 29.93382900 ) | C4 | 33 | 45.71740625 | 0.48484848 0.51515152 |
| 2462420 | 1231210 | left | (leaf) | NOT C4 | 9 | 0.00000000 | 1.00000000 0.00000000 |
| 2462421 | 1231210 | right | ( Red % >= 34.97943300 ) | NOT C4 | 62 | 66.23576147 | 0.77419355 0.22580645 |
| 3180274 | 1590137 | left | (leaf) | NOT C4 | 26 | 32.09657203 | 0.69230769 0.30769231 |
| 3180275 | 1590137 | right | (leaf) | C4 | 3 | 0.00000000 | 0.00000000 1.00000000 |
| 3237188 | 1618594 | lef | (leaf) | NOT C4 | 103 | 33.83008636 | 0.96116505 0.03883495 |
| 3237189 | 1618594 | right | (leaf) | NOT C4 | 65 | 52.28091333 | 0.86153846 0.13846154 |
| 3462298 | 1731149 | left | ( BlueStd < 34.00269100 ) | NOT C4 | 89 | 86.80809898 | 0.80898876 0.19101124 |
| 3462299 | 1731149 | right | (leaf) | C4 | 6 | 7.63817002 | 0.33333333 0.66666667 |
| 3466564 | 1733282 | left | (leaf) | NOT C4 | 8 | 0.00000000 | 1.00000000 0.00000000 |
| 3466565 | 1733282 | right | ( Red % >= 78.59946850 ) | NOT C4 | 63 | 66.74298108 | 0.77777778 0.22222222 |
| 3466566 | 1733283 | left | ( RedStd >= 28.70312000 ) | NOT C4 | 30 | 41.45539856 | 0.53333333 0.46666667 |
| 3466567 | 1733283 | right | (leaf) | C4 | 3 | 0.00000000 | 0.00000000 1.00000000 |
| 4924842 | 2462421 | left | ( Black % >= 33.68111600 ) | NOT C4 | 60 | 60.04829082 | 0.80000000 0.20000000 |
| 4924843 | 2462421 | right | (leaf) | C4 | 2 | 0.00000000 | 0.00000000 1.00000000 |
| 6924596 | 3462298 | left | (leaf) | NOT C4 | 11 | 0.00000000 | 1.00000000 0.00000000 |
| 6924597 | 3462298 | right | ( RGBMean >= 19.82349700 ) | NOT C4 | 78 | 81.79071184 | 0.78205128 0.21794872 |
| 6933130 | 3466565 | left | ( RGBStd < 30.32782150 ) | NOT C4 | 61 | 60.49046262 | 0.80327869 0.19672131 |
| 6933131 | 3466565 | right | (leaf) | C4 | 2 | 0.00000000 | 0.00000000 1.00000000 |
| 6933132 | 3466566 | left | (leaf) | NOT C4 | 9 | 6.27897773 | 0.88888889 0.11111111 |
| 6933133 | 3466566 | right | (leaf) | C4 | 21 | 27.91019442 | 0.38095238 0.61904762 |
| 9849684 | 4924842 | left | (leaf) | NOT C4 | 58 | 53.32439032 | 0.82758621 0.17241379 |
| 9849685 | 4924842 | right | (leaf) | C4 | 2 | 0.00000000 | 0.00000000 1.00000000 |
| 13849194 | 6924597 | left | (leaf) | NOT C4 | 9 | 0.00000000 | 1.00000000 0.00000000 |
| 13849195 | 6924597 | right | ( RGBStd < 36.33854900 ) | NOT C4 | 69 | 77.04809720 | 0.75362319 0.24637681 |
| 13866260 | 6933130 | left | (leaf) | NOT C4 | 58 | 53.32439032 | 0.82758621 0.17241379 |
| 13866261 | 6933130 | right | (leaf) | C4 | 3 | 3.81908501 | 0.33333333 0.66666667 |
| 27698390 | 13849195 | left | ( RGBStd >= 35.63215850 ) | NOT C4 | 59 | 59.59778423 | 0.79661017 0.20338983 |
| 27698391 | 13849195 | right | (leaf) | NOT C4 | 10 | 13.86294361 | 0.50000000 0.50000000 |
| 55396780 | 27698390 | left | (leaf) | NOT C4 | 18 | 0.00000000 | 1.00000000 0.00000000 |
| 55396781 | 27698390 | right | ( Red % < 71.37550350 ) | NOT C4 | 41 | 49.57199174 | 0.70731707 0.29268293 |
| 110793562 | 55396781 | left | (leaf) | NOT C4 | 39 | 44.40294840 | 0.74358974 0.25641026 |
| 110793563 | 55396781 | right | (leaf) | C4 | 2 | 0.00000000 | 0.00000000 1.00000000 |

What is claimed is:

1. A method of identifying a threat object of interest in X-ray image data, wherein the image data comprises a plurality of grey-scale or color pixel values, comprising:
receiving the X-ray image data; and
applying at least one predetermined bifurcation transform to the X-ray image data to effect divergence of the threat object of interest from other objects, wherein said at least one predetermined bifurcation transform is determined by applying at least one initial bifurcation transform to X-ray image data containing a known threat object that is substantially similar to said threat object of interest, and adjusting said at least one initial bifurcation transform so that the known threat object diverges from other objects in the X-ray image data once said predetermined bifurcation transform is applied to said X-ray image data.

2. The method of claim 1, wherein the at least one predetermined bifurcation transform comprises a series of predetermined bifurcation transforms.

3. The method of claim 1, wherein the at least one predetermined bifurcation transform comprises at least one point operation.

4. The method of claim 3, wherein the at least one point operation is at least partially a non-linear point operation.

5. The method of claim 3, wherein the at least one point operation comprises at least one nodal point.

6. The method of claim 5, wherein the at least one nodal point is adjusted so as to effect the divergence of the threat object of interest from other objects.

7. The method of claim 1, wherein the at least one predetermined bifurcation transform is adapted to maintain an integrity of the threat object of interest during divergence of the threat object of interest from other objects.

8. The method of claim 1, further comprising generating a threat output image based on the results of the at least one predetermined bifurcation transform.

9. The method of claim 8, wherein the threat object of interest is distinguished from other objects in the output image by adjusting a visual parameter of the threat object of interest and other objects based on the results of the at least one predetermined bifurcation transform.

10. The method of claim 1, wherein the X-ray image data comprises nonparametric image data.

11. The method of claim 1, wherein the X-ray image data comprises parametric image data.

12. The method of claim 1, wherein the threat object of interest is statistically indistinguishable from other objects in the X-ray image data.

13. The method of claim 1, wherein the threat object of interest comprises a plurality of types of threat objects, wherein each type of threat object comprises at least one member.

14. The method of claim 13, wherein the at least one predetermined bifurcation transform is generated for each member of the threat objects.

15. The method of claim 13, wherein the type of threat objects include explosives, weapons, restricted items, biological agent or materials, or chemical materials.

16. The method of claim 1, wherein the X-ray image data is scanner data.

17. The method of claim 1, wherein the X-ray image data includes a portion of an interior of a container.

18. The method of claim 17, wherein the container includes baggage, clothing or a person.

19. The method of claim 1, wherein the X-ray data comprises results from dual energy X-rays, at least one X-ray source or multiple scans of an input object.

20. An apparatus configured to identify a threat object of interest in X-ray image data wherein the image data comprises a plurality of grey-scale or color pixel values, comprising:
an input device configured to receive the X-ray image data; and
an image transformation recognition system configured to apply at least one predetermined bifurcation transform to the X-ray image data to effect divergence of the threat object of interest from other objects, wherein said at least one predetermined bifurcation transform is determined by applying at least one initial bifurcation transform to X-ray image data containing a known threat object that is substantially similar to said threat object of interest, and adjusting said at least one initial bifurcation transform so that the known threat object diverges from other objects in the X-ray image data once said predetermined bifurcation transform is applied to said X-ray image data.

21. A method of creating a bifurcation transform for a class of threat objects, comprising:
selecting a point operation;
performing said point operation on a subset of images, wherein said subset of images includes at least one image comprising a plurality of grey-scale or color pixels and containing an object in said class of threat objects; and
adjusting said point operation and repeating said selecting and said performing step until said point operation bifurcates said object.

22. The method of claim 21, wherein said point operation bifurcates said object by increasing differentials in response characteristics among objects in said class of threat objects relative to other objects in said subset of images.

23. The method of claim 21, wherein said class of threat objects comprises a plurality of types of threat objects, wherein each type of threat object comprises at least one member.

* * * * *